United States Patent
Long et al.

(10) Patent No.: US 10,574,110 B2
(45) Date of Patent: Feb. 25, 2020

(54) LIGHTWEIGHT AND EFFICIENT ELECTRICAL MACHINE AND METHOD OF MANUFACTURE

(71) Applicant: LAUNCHPOINT TECHNOLOGIES, INC., Goleta, CA (US)

(72) Inventors: Geoffrey Alan Long, Montara, CA (US); Bradley E. Paden, Goleta, CA (US); Michael Richard Ricci, Camarillo, CA (US); David Brian Paden, Goleta, CA (US); Jonathan Gordon Sugar, Ventura, CA (US)

(73) Assignee: LAUNCHPOINT TECHNOLOGIES, INC., Goleta, CA (US)

( * ) Notice: Subject to any disclaimer, the term of this patent is extended or adjusted under 35 U.S.C. 154(b) by 556 days.

(21) Appl. No.: 15/143,931

(22) Filed: May 2, 2016

(65) Prior Publication Data
US 2016/0365755 A1 Dec. 15, 2016

Related U.S. Application Data

(63) Continuation-in-part of application No. 13/634,636, filed as application No. PCT/US2011/026469 on Feb. 28, 2011, now abandoned.
(Continued)

(51) Int. Cl.
*H02K 3/28* (2006.01)
*H02K 3/24* (2006.01)
(Continued)

(52) U.S. Cl.
CPC .............. *H02K 3/28* (2013.01); *H02K 3/04* (2013.01); *H02K 3/24* (2013.01); *H02K 3/30* (2013.01);
(Continued)

(58) Field of Classification Search
CPC ................................. H02K 3/00–528
(Continued)

(56) References Cited

U.S. PATENT DOCUMENTS

| 1,144,252 | A | 6/1915 | Roebel |
| 2,821,641 | A | 1/1958 | Ringland |

(Continued)

FOREIGN PATENT DOCUMENTS

WO 2008/119120 10/2008

OTHER PUBLICATIONS

P. B. Reddy, T. M. Jahns and T. P. Bohn, "Transposition effects on bundle proximity losses in high-speed PM machines," 2009 IEEE Energy Conversion Congress and Exposition, San Jose, CA, 2009, pp. 1919-1926. (Year: 2009).*

(Continued)

*Primary Examiner* — Thomas Truong
(74) *Attorney, Agent, or Firm* — Brion Raffoul; Dennis Haszko

(57) ABSTRACT

A lightweight and efficient electrical machine element including a method of manufacture providing a stator winding for an electric machine which has a large portion of its volume containing electrically conductive strands and a small portion of its volume containing of an encapsulant material. The stator winding includes winding of a first phase by shaping a portion of a bundle of conductive strands into an overlapping, multi-layer arrangement. Winding of successive phases occurs with further bundles of conductor strands around the preceding phases constructed into similar overlapping, multi-layer arrangements. The multiple phases are impregnated with the encapsulant material using dies to press the bundles into a desired form while expelling excess encapsulant prior to the curing of the encapsulant material. The encapsulated winding is removed from the dies after the
(Continued)

encapsulant has cured. The encapsulant coating on the strands may be activated using either heat or solvent. The stator winding may be pressed into a form which has cooling channels which increase the surface area, thus enhancing convective cooling, heat dissipation, and the electrical machine's efficiency.

10 Claims, 39 Drawing Sheets

Related U.S. Application Data

(60) Provisional application No. 61/328,858, filed on Apr. 28, 2010.

(51) Int. Cl.
| | |
|---|---|
| H02K 3/47 | (2006.01) |
| H02K 3/04 | (2006.01) |
| H02K 3/30 | (2006.01) |
| H02K 15/04 | (2006.01) |
| H02K 15/12 | (2006.01) |
| H02K 3/02 | (2006.01) |
| H02K 21/24 | (2006.01) |

(52) U.S. Cl.
CPC ........... *H02K 3/47* (2013.01); *H02K 15/0478* (2013.01); *H02K 15/12* (2013.01); *H02K 3/02* (2013.01); *H02K 21/24* (2013.01); *H02K 2213/03* (2013.01)

(58) Field of Classification Search
USPC .... 310/266, 268, 156.32, 179, 180, 208, 43, 310/54, 64
IPC ....................................................... H02K 3/24
See application file for complete search history.

(56) References Cited

U.S. PATENT DOCUMENTS

| | | | |
|---|---|---|---|
| 3,922,574 A * | 11/1975 | Whiteley | H02K 3/46 310/156.32 |
| 4,868,970 A | 9/1989 | Schultz et al. | |
| 4,896,063 A | 1/1990 | Roberts | |
| 4,949,002 A | 8/1990 | Ibe et al. | |
| 5,197,180 A | 3/1993 | Mihalko | |
| 5,977,679 A | 11/1999 | Miller et al. | |
| 5,982,069 A | 11/1999 | Rao | |
| 5,984,647 A * | 11/1999 | Miyamoto | H01B 3/44 29/596 |
| 6,216,513 B1 | 4/2001 | Nakamura et al. | |
| 6,444,916 B2 | 9/2002 | Tamura et al. | |
| 6,885,162 B2 | 4/2005 | Stridsberg | |
| 7,521,834 B2 | 4/2009 | Patterson et al. | |
| 8,823,238 B2 | 9/2014 | Greaves et al. | |
| 2002/0163273 A1 | 11/2002 | Huth | |
| 2005/0016658 A1 | 1/2005 | Asokan et al. | |
| 2005/0035672 A1 * | 2/2005 | Ward | H02K 1/182 310/54 |
| 2006/0232158 A1 | 10/2006 | Patterson et al. | |
| 2008/0272666 A1 | 11/2008 | Halstead | |
| 2010/0001610 A1 * | 1/2010 | Iki | H02K 3/26 310/208 |
| 2010/0117481 A1 * | 5/2010 | Greaves | H02K 3/47 310/208 |
| 2010/0277136 A1 * | 11/2010 | Snitchler | H02K 1/165 322/59 |
| 2011/0221287 A1 * | 9/2011 | Lucchi | H02K 3/24 310/54 |
| 2013/0300241 A1 * | 11/2013 | Wedman | H02K 3/28 310/156.01 |
| 2015/0303755 A1 * | 10/2015 | Rippel | H02K 3/47 310/45 |

OTHER PUBLICATIONS

Halbach, "Physical and Optical Properties of Rare Earth Cobalt Magnets", Nuclear Instruments and Methods 187, pp. 109-117, 1981, Berkeley, California, US.
Zhu et al., "Halbach permanent magnet machines and applications: a review", Zhu, Z.Q., Howe, D., IEE Proc.—Electr. Power Appl., vol. 148, No. 4, Jul. 2001, 10 pages.
Lovatt et al., "Design of an In-Wheel Motor for a Solar-Powered Electric Vehicle", IEE Proc. Electrical Machines and Drives, No. 444, 1997, 5 pages.
Gieras et al., "Axial Flux Permanent Magnet Brushless Machines", Gieras, J.F., Wang, R.J, Kamper, M.J., 2nd Edition, Springer Science + Business Media B.V., 2008, chapter 6, 31 pages.
Cocconi, "Optimized Electric Drive Systems", presented to the Electric Aircraft Symposium, Apr. 2008, 15 pages.
Welchko, el al, "Fault Interrupting Methods and Topologies for Interior PM Machine Drives", IEEE Power Electronics Letters (vol. 2, Issue 4), Dec. 27, 2004, 5 pages.
Miller, "Propulsion Systems for Hybrid Vehicles", pp. 136-137, Institution of Engineering and Technology (IET), Jan. 28, 2000.

* cited by examiner

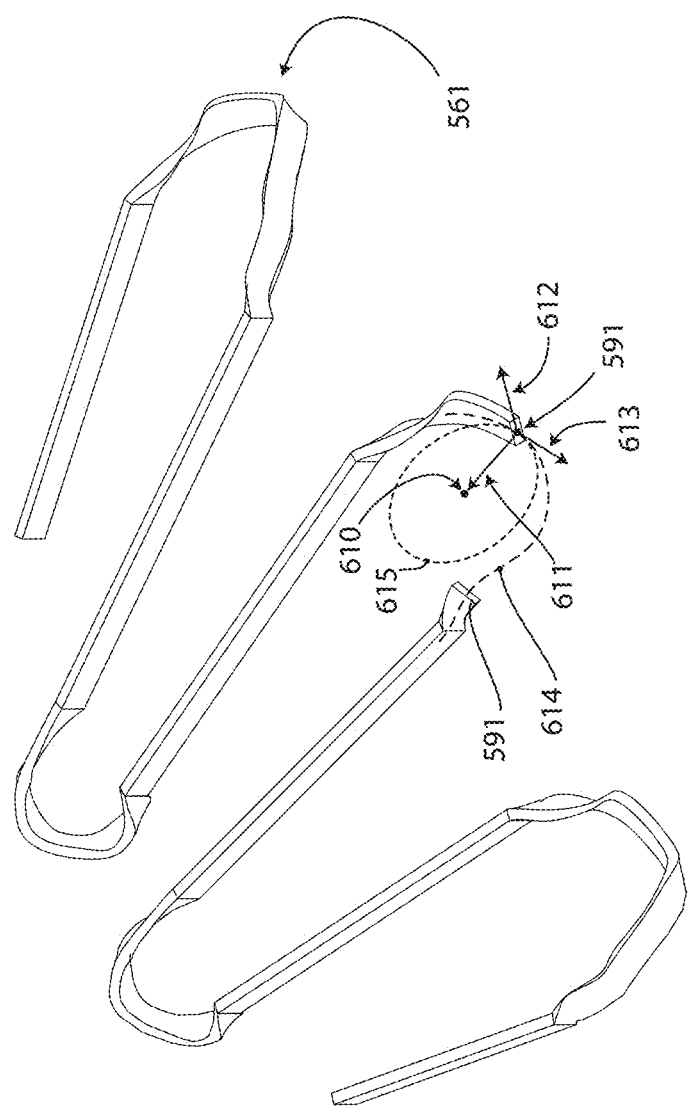

LIGHTWEIGHT AND EFFICIENT ELECTRICAL MACHINE AND METHOD OF MANUFACTURE

CROSS-REFERENCE TO RELATED APPLICATIONS

This application is a continuation-in-part of U.S. application Ser. No. 13/634,636 filed 13 Sep. 2012, which is a national stage entry of Patent Cooperation Treaty Application No. PCT/US2011/026469 filed on 28 Feb. 2011, which claims priority to U.S. Provisional Application No. 61/328,858 filed 28 Apr. 2010.

FEDERALLY SPONSORED RESEARCH OR DEVELOPMENT

This invention was made with Government support under contract W31P4Q-09-C-0109 awarded by the U.S. Army Aviation and Missile Command and under contract N68335-15-C-0054 awarded by the Naval Air Warfare Center Aircraft Division. The Government has certain rights in the invention.

BACKGROUND OF THE INVENTION

This invention relates to electrical machinery such as motors and generators and more particularly to an electrical machine with an electrically commutated stator.

There are many applications which would benefit from an electric machine with reduced weight and high efficiency. Examples include electric aircraft propulsion, spacecraft mechanisms, wind turbine electricity generators, electrically propelled automobiles, etc.

Iron commonly constitutes a large portion of the weight of an electric machine. In the stator, iron is commonly used to shape the magnetic field and to transmit the torque of the device to the base of the machine. However, "coreless" electric machines do not have iron in the stator. In some cases, these coreless machines can result in an overall weight reduction due to their lack of iron.

Coreless machines must provide an alternative method for transmitting the torque of the machine to the base. The electrically conductive strands of which the stator is made do not generally have sufficient strength to transmit the torque themselves. A material such as epoxy or other adhesive is commonly used to encapsulate the stator electrical conductor strands to create a composite part with the required structural strength. The amount of encapsulant required to provide this structural strength is quite small, and excess encapsulant is detrimental both to dissipating heat out of the machine, and because it increases the weight of the machine. It is also desirable to maximize the amount of volume in the stator which is filled by the electrical conductor strands, which necessitates minimization of unnecessary encapsulant.

Coreless machines sometimes use Litz wire in the windings to reduce the eddy current losses in the conductors. Litz wire consists of many fine strands of electrically conductive material, such as copper, which are each coated with a thin layer of electrical insulation. The strands of Litz wire are generally twisted or braided to reduce skin and proximity effects at high frequency.

In 1981, Klaus Halbach published a paper which described an arrangement of magnets which has since been commonly referred to as a "Halbach array". A Halbach array consists of several magnet segments which each have a similar or identical shape, but which have a magnetic orientation which rotates by an increment from one segment to the next adjacent segment. The result is that the magnetic field of the array is concentrated on one side of the array and cancelled on the other side of the array without the need for a ferromagnetic material such as iron to shape the field. If the magnet segments are of identical shape and the orientation increment is a fixed value, the variation of the magnetic field on the concentrated side is approximately sinusoidal.

The concentrated nature of the magnetic field of a Halbach array makes them ideally suited for use in electrical machines such as motors and generators. In rotating machines, the Halbach array can be arranged as a cylinder with the field either substantially in the radial direction or substantially in the axial direction. Furthermore, there can be a Halbach array on both sides of the winding, or there may just be a Halbach array on only one side of the winding. Having a Halbach array on each side of the winding increases the useful magnetic field in the stator winding.

SUMMARY OF THE INVENTION

Accordingly, it is an objective of this invention to provide an improved stator winding for an electric machine which has a large portion of its volume comprised of electrically conductive strands and a small portion of its volume comprised of an encapsulant material.

It is further an objective of this invention to provide a method for manufacturing said improved stator winding.

It is further an objective of this invention to provide an electrical machine which makes use of said improved stator winding to improve efficiency and reduce weight.

It is a further objective of this invention to improve the thermal performance of the winding by providing improved thermal paths to conduct and convect heat away from the winding.

It is a further objective of this invention to reduce the incidence of broken strands within the Litz conductor and allow for optimal Litz conductor dimensions for windings with phase counts greater than three.

It is a further objective of this invention to minimize the possibility of a turn to turn short circuit within any individual winding phase.

To achieve the above and other objectives of the invention, a method for manufacturing a stator winding according to one aspect of the invention includes the steps of winding a first phase by shaping a portion a bundle of conductive strands into an overlapping, multi-layer arrangement; winding successive phases with further bundles of conductor strands around the preceding phases into similar overlapping, multi-layer arrangements; impregnating the multiple phases with an encapsulant material; using dies to press the bundles into a desired form while expelling excess encapsulant prior to the curing of the encapsulant material; removing the encapsulated winding from the dies after the encapsulant has cured. The encapsulant material may be pure epoxy resin, epoxy resin filled with glass fibers, epoxy resin filled with carbon fiber, epoxy resin filled with carbon nanotubes, polyimide, polyetherimide, or thermosetting polymer.

According to another aspect of the invention, a method for manufacturing a stator winding includes the steps of individually coating conductive strands with a layer of encapsulant adhesive which is partially cured but can later be heat or solvent activated; making a bundle of multiple of these encapsulant coated strands; winding a first phase by shaping a portion of the bundle into an overlapping, multi-layer arrangement; winding successive phases with further bundles around the preceding phases into similar overlapping, multi-layer arrangements; using dies to press the bundles into a desired form; activating the encapsulant coating on the strands using either heat or solvent; removing the encapsulated winding from the dies after the encapsulant has cured.

According to another aspect of the invention, the stator winding is pressed into a form which has cooling channels which increase the surface area, improving convective cooling and thus improving heat dissipation and the electrical machine's efficiency.

According to yet another aspect of the invention, the stator winding is pressed into a form which has minimal encapsulant and maximal electrically conductive material.

According to still another aspect of the invention, an electrical machine has a formed stator winding which is formed to have minimal encapsulant and a rotor which includes two magnet arrays which are a type of Halbach array.

According to yet another aspect of the invention, an electrical machine has a formed stator, a rotor which includes two Halbach arrays, and an arrangement of impeller features which pull surrounding air through the motor. The forced airflow improves the dissipation of heat from the stator winding.

According to another aspect of the invention, thermally conductive rings are added to the stator winding end turns to provide a better thermal interface to conductively cool the stator and increase surface area for convectively cooling the stator.

According to another aspect of the invention, fin structures are added to the stator winding end turns to provide a better thermal interface via increased surface area for convectively cooling the stator.

According to another aspect of the invention, a fluid passage is added within the end turns to convectively cool the winding by flowing coolant through the passage.

According to another aspect of the invention, the stator winding is made from rectangular shaped Litz wire which allows for axially taller and circumferentially narrower winding legs to facility phase counts greater than three without excessive forming of the Litz wire and without related broken Litz wire strands. The rectangular wire also allows the end turns to nest naturally without forming operations to change the wire conductor cross sectional shape.

According to another aspect of the invention a single-layer overlapping stator winding is made from rectangular Litz wire conductors that eliminates the possibility of a turn to turn short happening within a phase conductor.

BRIEF DESCRIPTION OF THE DRAWINGS

FIG. 61 is an expanded view of part of the conductor in FIG. 56 with a section cut from the end turn to show the conductor cross sections.

DETAILED DESCRIPTION

Figure 1:
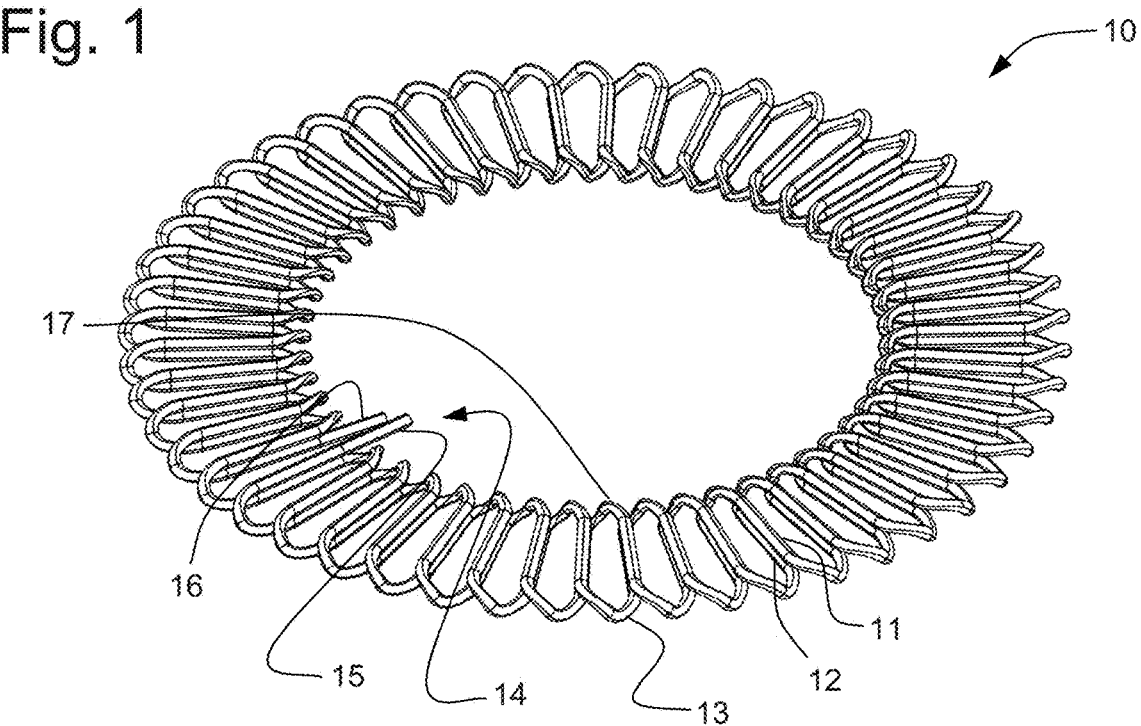
FIG. 1 is a perspective view of a bundle of strands which has been wound into an overlapping, two-layer arrangement according to an embodiment of the invention.

Referring now to the drawings wherein like reference numerals designate corresponding structure throughout the views, and referring in particular to FIG. 1, a first phase 10 according to one embodiment of the invention is made from a bundle of conductive strands. The bundle is wound into a shape which has a first layer 11, which is adjacent to a second layer 12. The bundle is wound starting from a first terminal 15 in the first layer and is shaped into an outer end turn 13 which places it in the second layer, then an inner end turn 17 places it back in the first layer. The winding of the phase continues in the clockwise direction, alternating between the first and second layers, until both the first and second layers are filled and the bundle ends with a second terminal 16. When the first phase is used in an electric machine, the terminals 14 consisting of the first terminal 15 and second terminal 16 are used to pass current through the first phase to generate torque. In alternative embodiments, the first phase can be sectioned into multiple portions with multiple terminals rather than consisting of a single bundle of strands as depicted by 10.

While the embodiment depicted in FIG. 1 consists of a single turn, alternative embodiments can consist of multiple turns. Each successive turn repeats the same pattern as the first turn and is adjacent to the preceding turns. In still further alternative embodiments, each phase is subdivided into portions of a turn. The advantage of subdividing the phase is to reduce the back EMF or to allow for redundancy.

Figure 2:
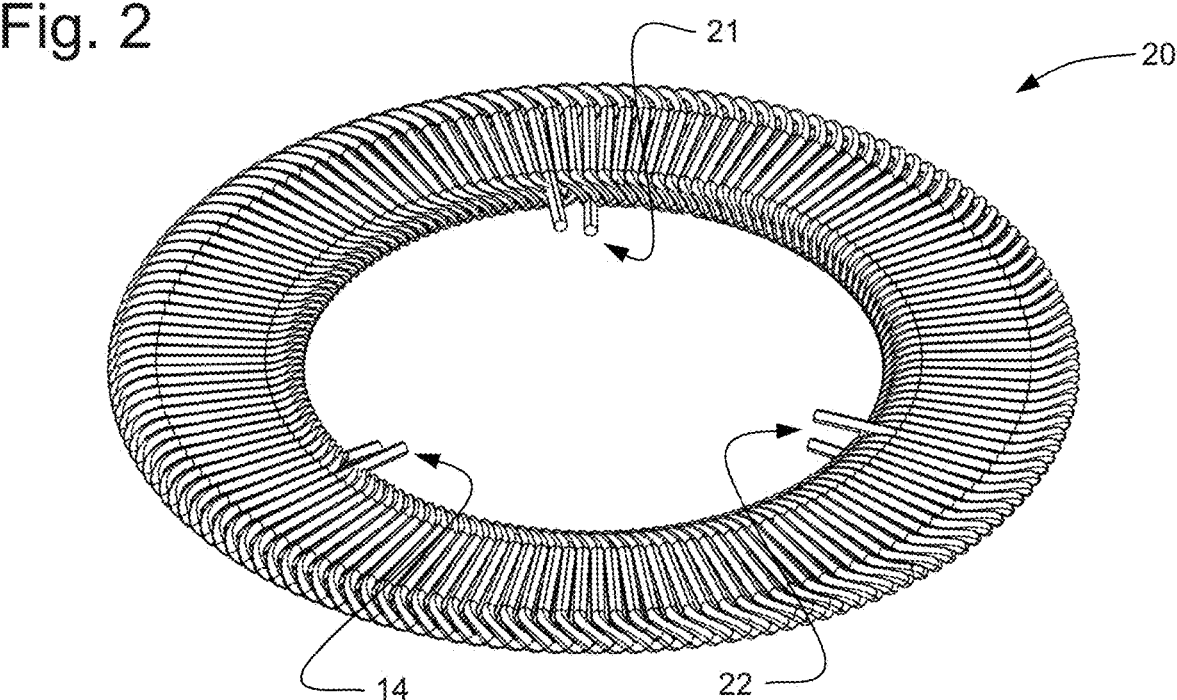
FIG. 2 is a perspective view of three bundles of strands which have been wound around each other in an overlapping, two-layer arrangement as a preliminary step towards creating a three phase winding according to an embodiment of the invention.

Referring now to FIG. 2, according an embodiment of the invention, a three phase winding 20 is wound by winding a second phase with terminals 21 and a third phase with terminals 22 around the first phase with terminals 14 in a similar manner as the first phase 10 shown in FIG. 1. In an alternative embodiment, the winding can consist of four or more phases. A winding with 2 or more phases will be referred to as a poly-phase winding or multi-phase winding.

Figure 3:
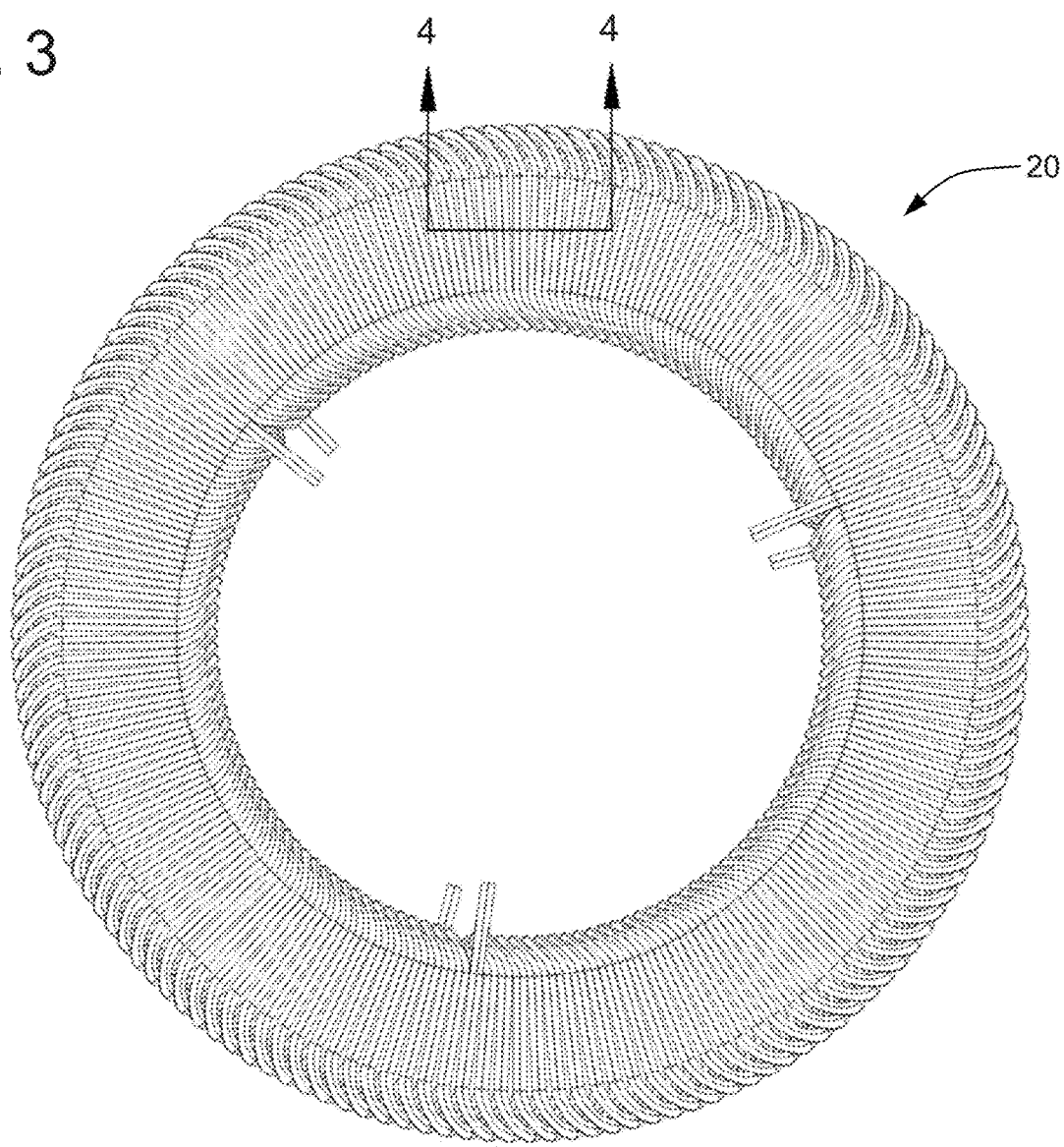
FIG. 3 is a top view of the three phase winding of FIG. 2.
Figure 4:
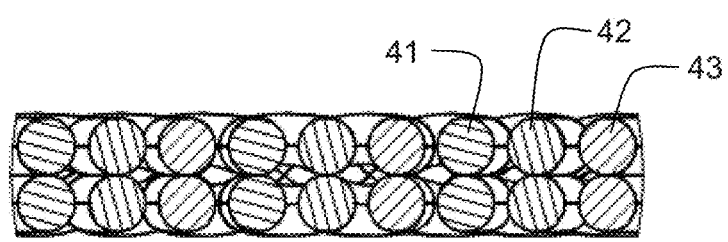
FIG. 4 is an enlarged cross-section view of the three phase winding of FIG. 3 along the line 4-4 thereof, which illustrates the relative arrangement of the three phases in the active area of the stator.

The three phase winding 20 is also depicted in FIG. 3 which defines the line 4-4 along which the cross-section of FIG. 4 is taken. As shown in FIG. 4, the three phases are interleaved with a first phase 41 being adjacent to a second phase 42 and a third phase 43. According to the preferred embodiment of the invention, the first layer of each phase is located directly above the second layer, corresponding to a zero-degree electrical shift between the two layers. However, in alternative embodiments, the first and second layers can be offset from each other by up to 90 electrical degrees.

Figure 5:
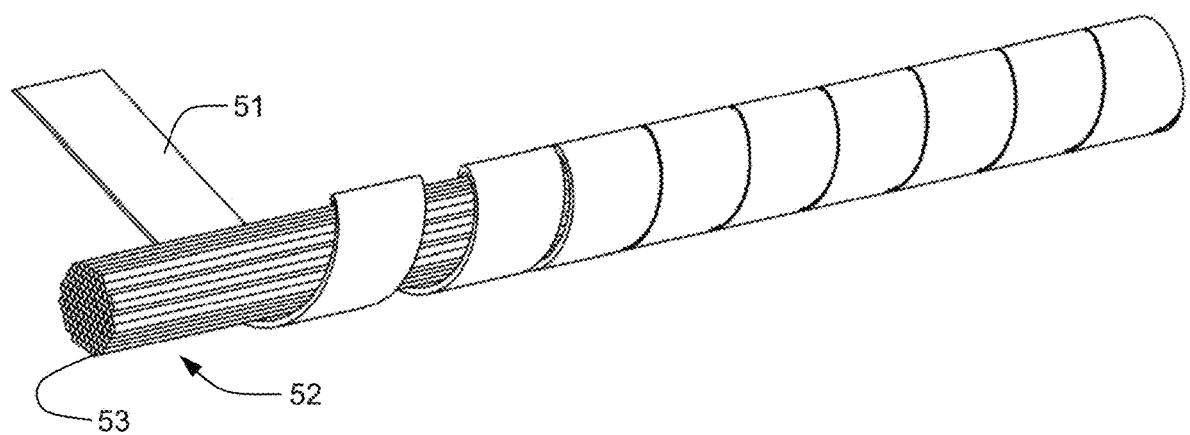
FIG. 5 is a perspective view of a circular bundle of strands with insulation partially unwound to expose the strands of which it consists, also known as Type 2 Litz wire.

Referring now to FIG. 5, a bundle of conductive strands 52 is depicted. The bundle of conductive strands 52 consists of conductive strands 53 which are wrapped with a serving material 51 which keeps the strands bound together and provides electrical insulation between adjacent bundles when formed into a winding. Stranded conductors may be insulated from other strands within the same phase. According to a preferred embodiment, the serving material 51 consists of nylon textile yarn. However, in alternative embodiments, the serving material 51 may consist of heat shrink tubing or aramid fiber yarn or polyimide tape or fiberglass or polymer tape. According to a preferred embodiment of the invention, the conductive strands are manufactured from copper and are individually coated with an electrically insulating material such as polyurethane. However, in alternative embodiments, the conductive material is replaced with another metal such as silver or aluminum. The conductive strands can also be interspersed with fibers of stiffer or stronger fibers of carbon, carbon nanotubes or aramid. It should be therefore readily apparent that as fibers are interspersed with conductive strands, they are therefore woven together—i.e., woven into the bundled conductive strands along with the conductive strands. The woven or braided strands are known as Litz Wire in the art as previously mentioned and the round woven bundle of strands shown in the FIG. 5 is known as Type 2 Litz. The weaving and braiding ensures that each strand within the bundle uniformly occupies all of the different locations within the bundle cross section over a length of the Litz wire known as a twist length. The weaving and braiding significantly increases the thermal conductivity across the section of the bundle which improves thermal performance of the winding. Additionally, the braiding ensuring that the strands transpose into all of the cross sectional positions of the bundle prevents different voltages from being induced in the insulated strands which would result in circulating currents within the bundle and create energy loss and heat in the winding. In this manner, the Litz wire can be seen as a new way of achieving the conductor transposition used in the Roebel bars of very large industrial machines. Roebel bars are described in the German Pat. No. 277,012 granted to Brown et al. on Mar. 18, 1912 and in the U.S. Pat. No. 2,821,641 granted to Ringland on Jan. 28, 1958, but also outside the patent literature, for example in Standard Handbook for Electrical Engineers, McGraw Hill, 10th Edition, Sec. 6, page 31. In still further alternative embodiments, the electrically insulating coating can be either omitted, replaced with an alternative material such as polyimide, or be augmented with a top coating of heat or solvent activated adhesive coating. A heat or solvent activated adhesive coating allows the bundle to remain flexible during the winding process, but creates a rigid part after winding is complete and the adhesive coating is activated by application of heat or solvent.

Figure 49:
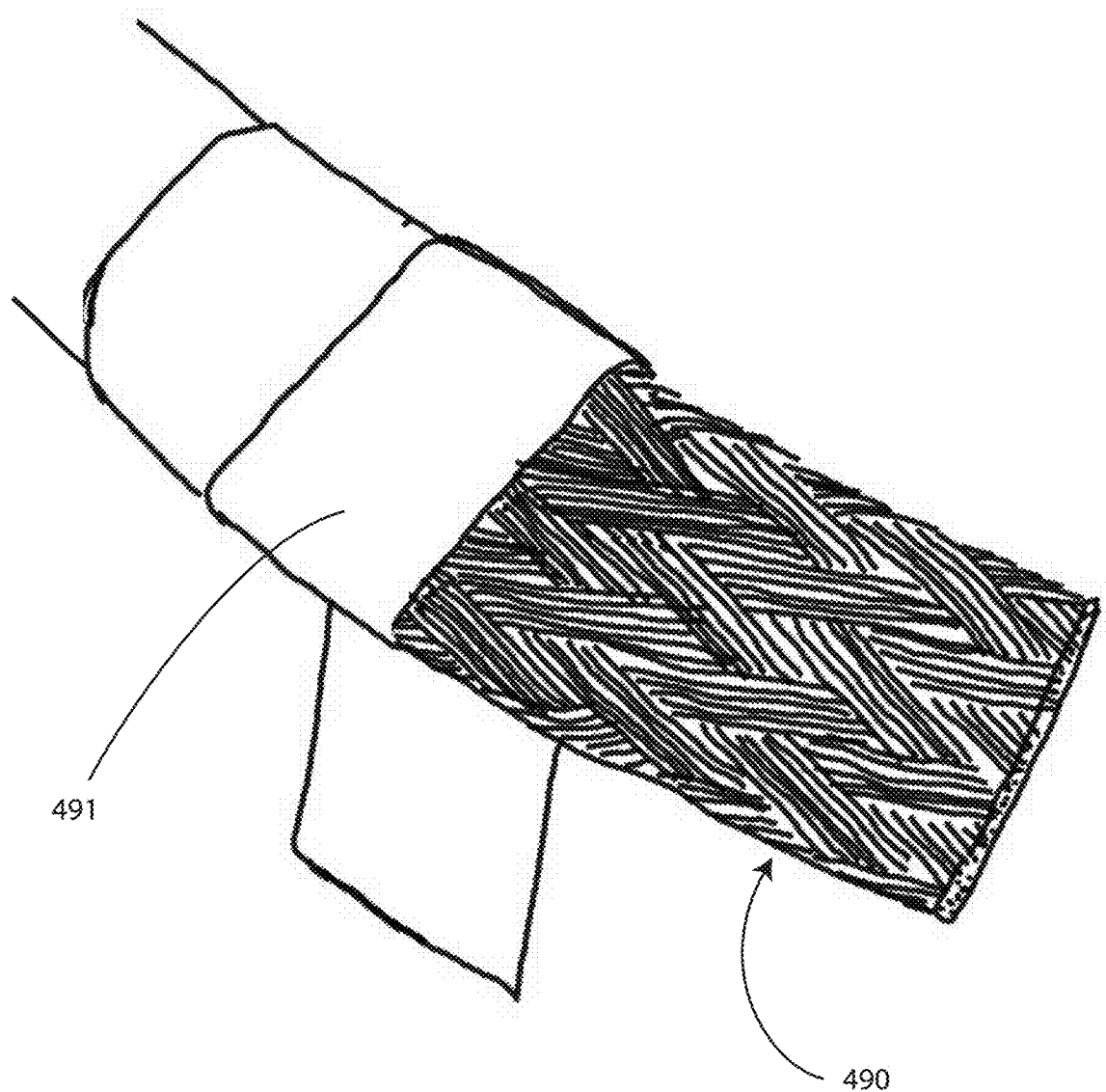
FIG. 49 is an illustration of type 7 Litz wire.
Figure 50:
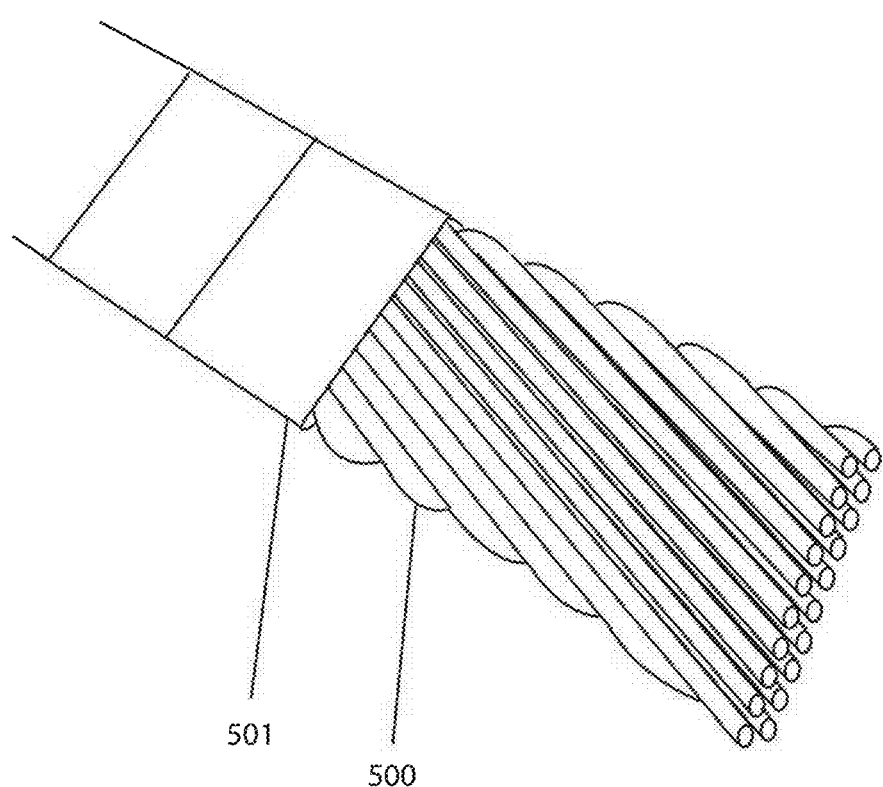
FIG. 50 is an illustration of type 8 Litz wire.

Referring to FIG. 49, the woven bundle of conductive fibers 490 may be braided into a rectangular flat braid instead of a round bundle. An insulating serving 491 may be applied by carefully controlling the tension during wrapping to prevent distortion of the rectangular cross section from excessive wrapping tension. This rectangular woven braid with insulated strands is known as type 7 Litz wire. FIG. 50 shows a similar Litz construction where the strands are twisted and formed into a rectangular bundle 500 which is known as type 8 Litz wire. In a further embodiment of the invention, the electrical machine winding may be wound with rectangular type 7 Litz wire or rectangular type 8 Litz wire. Windings made of type 2 Litz are known in the prior art (for example as described in U.S. Pat. No. 8,823,238 granted to Greaves et al. on Sep. 2, 2014) but windings made of type 7 Litz and type 8 Litz are not known.

The bundle of strands 52 is relatively compliant prior to being encapsulated and can be bent into a variety of shapes. Its cross-sectional shape can also be formed into a variety of shapes prior to being encapsulated. However, due to its compliant nature, the bundle of strands will not generally retain these shapes until the bundle is encapsulated as described below.

Figure 6:
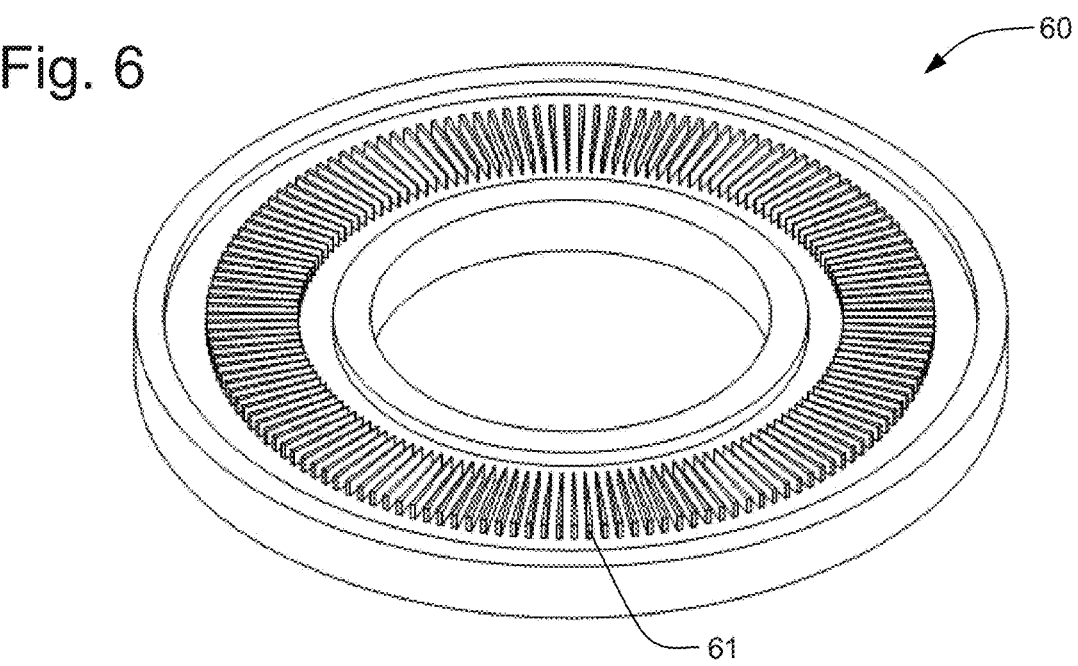
FIG. 6 is a perspective view of a die with teeth features which is used to form a winding into a desired shape.
Figure 7:
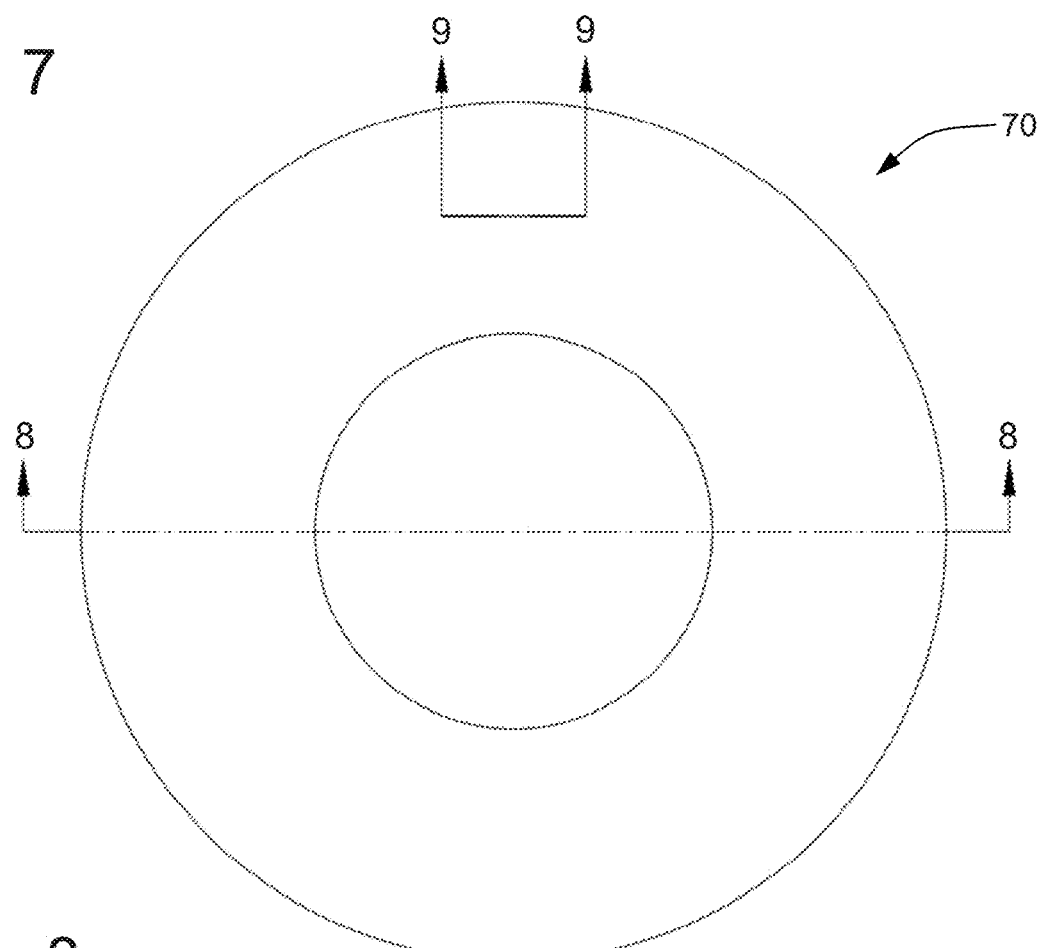
FIG. 7 is a top view of an assembly which is used to form a winding into a desired shape which includes cooling channels according to an embodiment of the invention, shown just prior to the forming stage of the process.
Figure 8:
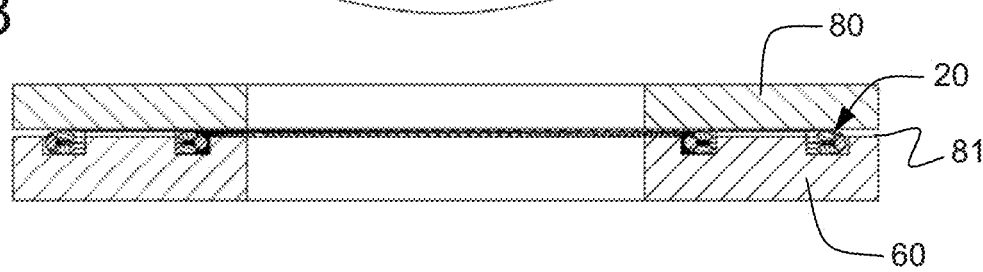
FIG. 8 is a cross-section view of the assembly of FIG. 7 along the line 8-8 thereof, which illustrates the relative placement of the winding with respect to the dies prior to the winding being formed.
Figure 9:
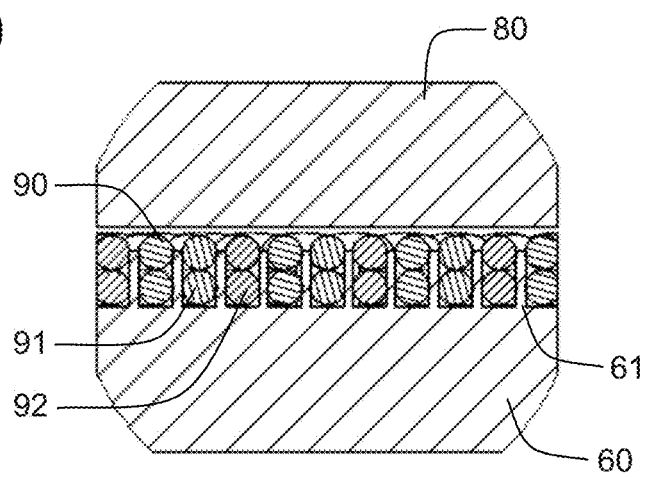
FIG. 9 is an enlarged cross-section view of the assembly of FIG. 7 along the line 8-8 thereof, which illustrates the interleaving of the winding bundles between the teeth of one of the dies, prior to the winding being formed.

Referring briefly now to FIG. 6, a toothed die 60 is depicted which includes teeth features 61. Referring now to FIG. 7, according to an embodiment of the invention an un-pressed forming assembly 70 is depicted. The lines 8-8 and 9-9 in FIG. 7 define the cross-section views of FIG. 8 and FIG. 9 respectively. Referring now to FIG. 8, the un-pressed forming assembly 70 is shown prior to the forming of the winding such that the toothed die 60 is separated from a smooth die 80 by a gap 81. The three phase winding 20 is shown situated between the toothed die 60 and the smooth die 81. Referring now to FIG. 9, it can be seen that the teeth features 61 of the toothed die 60 are interleaved between the first phase 90, the second phase 91, and the third phase 92 of the three phase winding 20. At this stage, the cross sections of the phases 90-92 are in a relaxed state and are approximately round.

Figure 10:
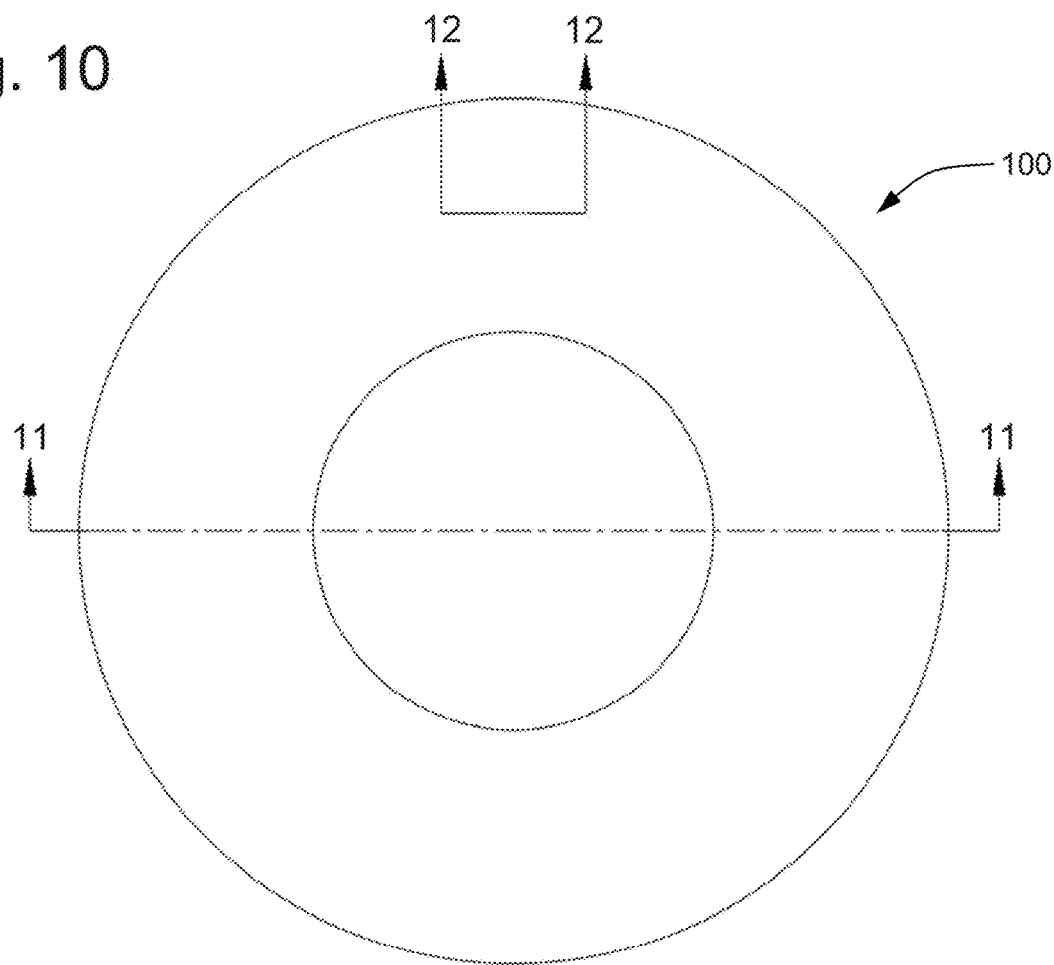
FIG. 10 is a top view of an assembly which is used to form a winding into a desired shape, shown just subsequent to the forming stage of the process.
Figure 11:
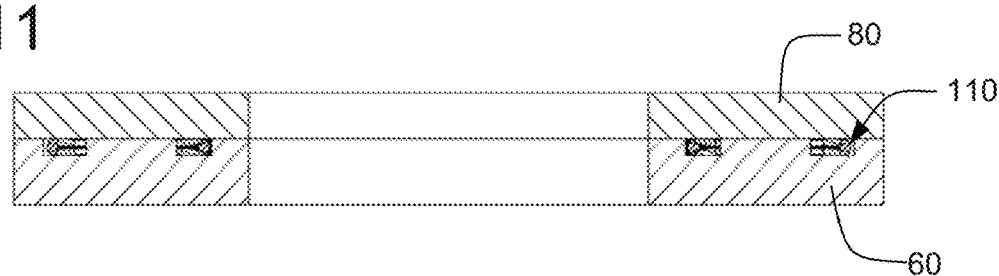
FIG. 11 is a cross-section view of the assembly of FIG. 10 along the line 11-11 thereof, which illustrates the relative placement of the winding with respect to the dies subsequent to the winding being formed.
Figure 12:
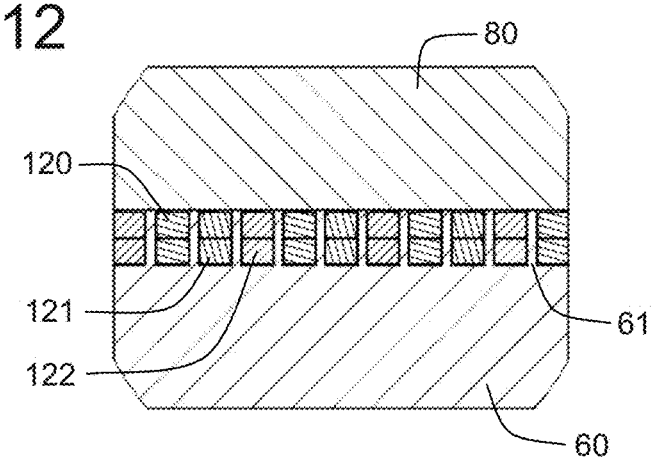
FIG. 12 is an enlarged cross-section view of the assembly of FIG. 10 along the line 12-12 thereof, which illustrates the approximately rectangular shape into which the bundles have been formed.

By pressing the smooth die 80 and the toothed die 60 together, the winding 20 can be formed into a shape that is defined by the shapes of faying surfaces of the dies. FIG. 10 shows the pressed forming assembly 100, which is created by pressing the smooth die 80 and the toothed die 60 of the un-pressed forming assembly 70 together, until the gap 81 is eliminated. The lines 11-11 and 12-12 in FIG. 10 define the cross-section views of FIG. 11 and FIG. 12, which depict further detail. In FIG. 11, the formed winding 110 is shown pressed between the smooth die 80 and the toothed die 60. In FIG. 12, the cross-sections of the three phases 120-122 are now approximately rectangular as a result of pressing the forming operation.

From the aforementioned figures, it is readily apparent that the use of dies 60 and 80 only constrain the overall shape of the end turns of the combined phase bundles. Thus, the conductive strands in the individual phase end turn bundles (e.g., within Litz wire end turns) conform to each other during the pressing process, and the conductor bundles of the various phases conform to each other in the end turn in addition. The shape of the individual phase end turns may thus vary somewhat from turn to turn provided that the overall shape fits within the space defined by the dies 60 and 80. Such flexibility in the end turn shape enables a) conductor and overall winding shapes that are formed in a single step—i.e., each phase consists of a bundle of conductive strands which has been shaped into an overlapping, multi-layer arrangement and, simultaneously, which has been pressed into a desired form, b) improved packing of the phase end turns and c) improved heat transfer which is a key limiting factor in high-power motors. As the end turns conform in this manner without compression via a die, one may accordingly refer to the resulting shape of the end turns as "phase-to-phase conformal." This contrasts with an approach which forms each phase end turn in a compressed state with a die. Such a compressed end turn approach results in a lower packing factor, an added step in the winding forming process, and poorer heat transfer. We can therefore describe this end turn shape produced by this later process as "phase-to-die conformal." Dies 60 and 80 do constrain the individual phase bundles in the magnetic gap or so-called active leg area of the stator for proper alignment of the conductors to the magnetic field. The phase bundles are phase-to-die conformal and therefore compressed in the active area, though remain uncompressed and phase-to-phase conformal in the end turns.

According to a preferred embodiment, an encapsulant material can next be vacuum impregnated into voids between the individual strands and between the two dies. However, according to another embodiment, encapsulant material could have been impregnated into the voids of the un-pressed forming assembly 70 prior to the forming operation. According to still another embodiment, an injection molding process is used to impregnate the assembly with encapsulant.

Figure 13:
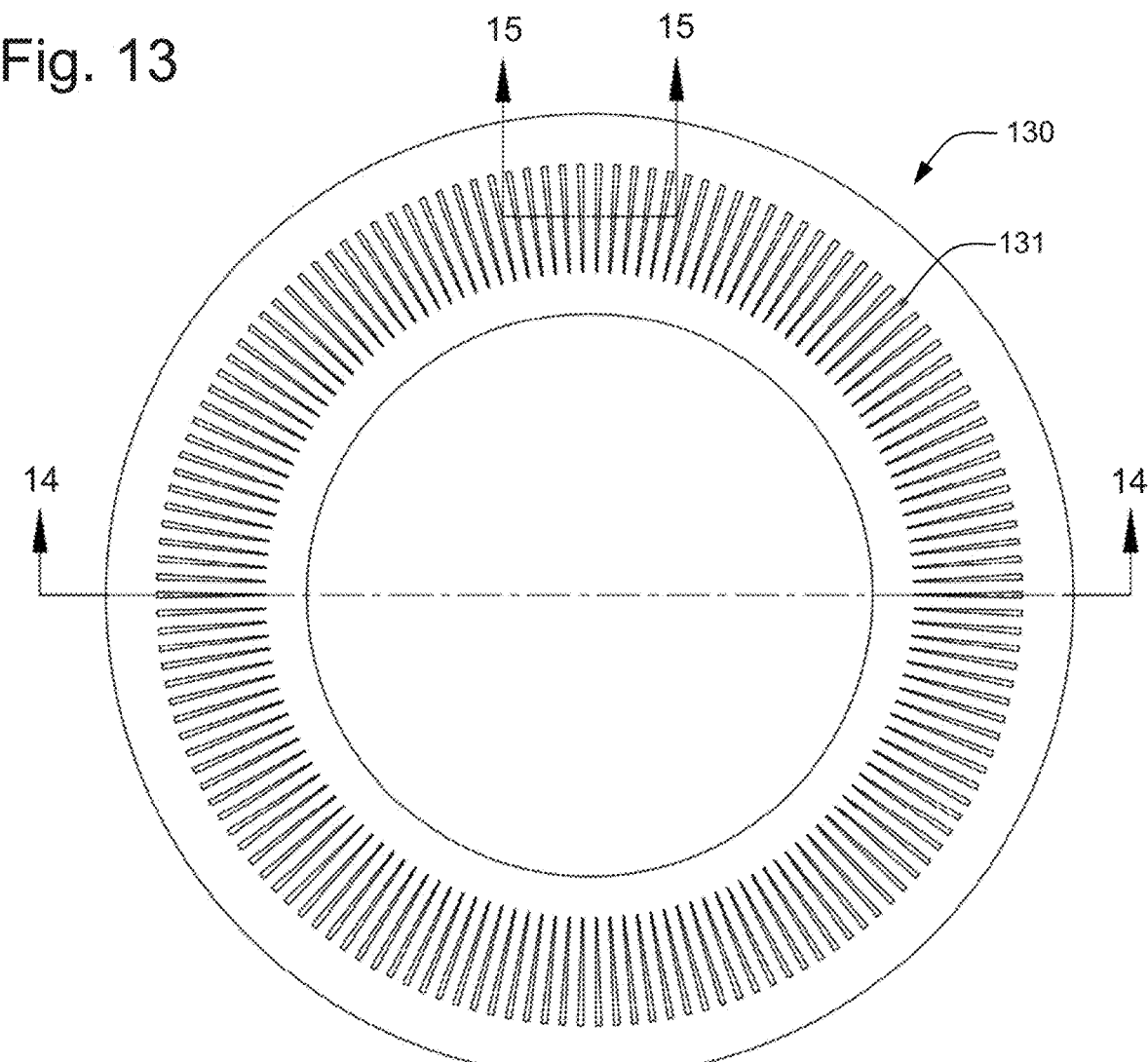
FIG. 13 is a top view of a formed and encapsulated winding which includes cooling channels, according to an embodiment of the invention.
Figure 14:
FIG. 14 is a cross-section of the winding of FIG. 13 along the line 14-14 thereof.
Figure 15:
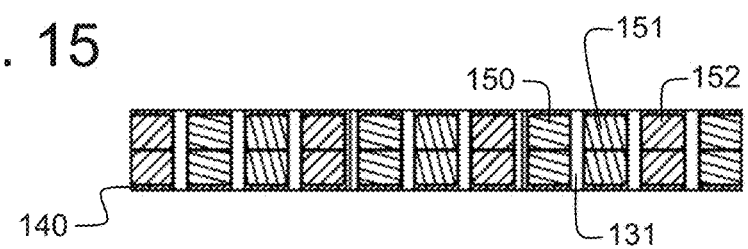
FIG. 15 is an enlarged cross-section view of the winding of FIG. 13 along the line 15-15 thereof.

Referring now to FIG. 13, a formed and encapsulated winding 130 is depicted after the encapsulant material has cured and after it has been removed from the pressed forming assembly 100. Cooling channels 131 have been formed where the teeth 61 of the toothed die 60 once were. These cooling channels are shown as being axial in orientation and serve to increase the surface area from which heat can be extracted from the winding during operation of the electrical machine, thus reducing the operation temperature of the machine and improving efficiency. The lines 14-14 and 15-15 define the cross-section views of FIG. 14 and FIG. 15 respectively. In FIG. 14, the cross sections of the three phases 142-144 are shown along with the small amount of excess encapsulant 140. In FIG. 15, the cross sections of the three phases 150-152 are depicted, which have retained their approximately rectangular shape due to the encapsulant material which has made them structurally rigid and strong.

According to an alternative embodiment of the invention, the channels 131 which have been formed into the winding 130 can be filled with a stiffening or strengthening material such as titanium, carbon fiber composite, a carbon nanotube composite, sapphire, ceramic, etc. As such, the winding stiffness may be increased.

Figure 16:
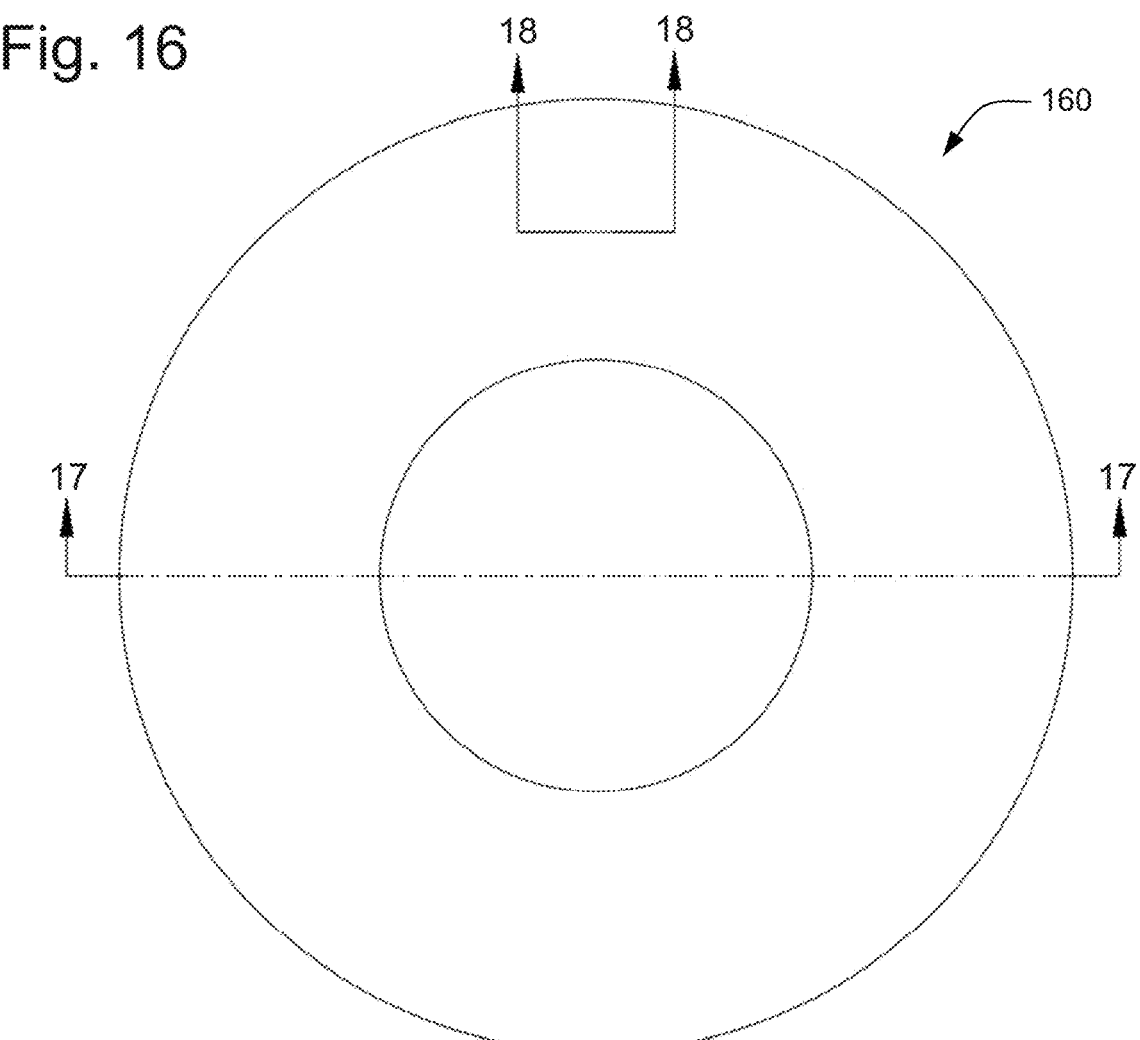
FIG. 16 is a top view of an assembly which is used to form a winding into a desired shape according to an embodiment of the invention, shown just prior to the forming stage of the process.
Figure 17:
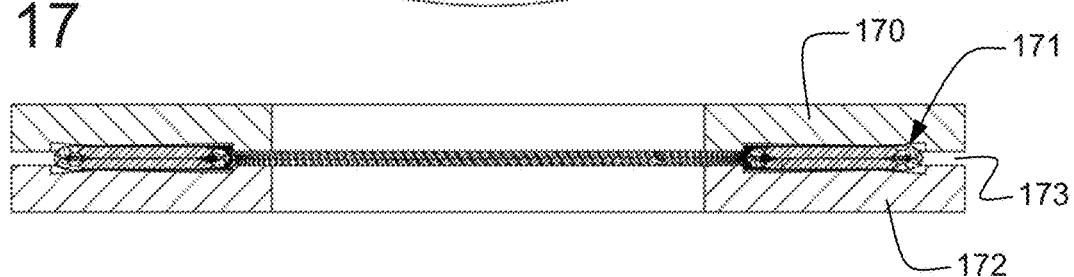
FIG. 17 is a cross-section of the assembly of FIG. 16 along the line 17-17 thereof, which illustrates the relative placement of the winding with respect to the dies prior to the winding being formed.
Figure 18:
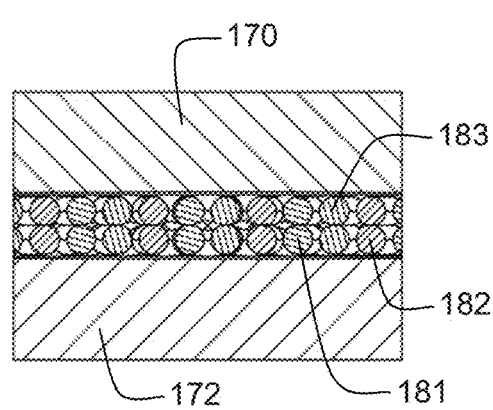
FIG. 18 is an enlarged cross-section view of the assembly of FIG. 16 along the line 18-18 thereof, prior to the winding being formed.

According to an alternative embodiment of the invention, a winding can be made to have maximal conductor volume and without cooling channels. An un-pressed forming assembly 160 corresponding to this alternative embodiment is shown in FIG. 16. The lines 17-17 and 18-18 in FIG. 16 define the cross-sections of FIG. 17 and FIG. 18 respectively, which contain further detail. The un-pressed forming assembly 160 consists of a three phase winding 171 and two dies 170 and 172 which in this embodiment of the invention do not have teeth as the toothed die 60 did. At this stage, there is a gap 173 between the two dies 170 and 172. The tapered faces of the dies are designed such that they form the phase bundles into a tapered shape with no cooling channels, but with maximal volume occupied by conductive strands. This shape has improved efficiency and torsional stiffness compared the shape which included cooling channels. As shown in FIG. 18, the three phases 181, 182 and 183 are interleaved with a gap between them.

Figure 19:
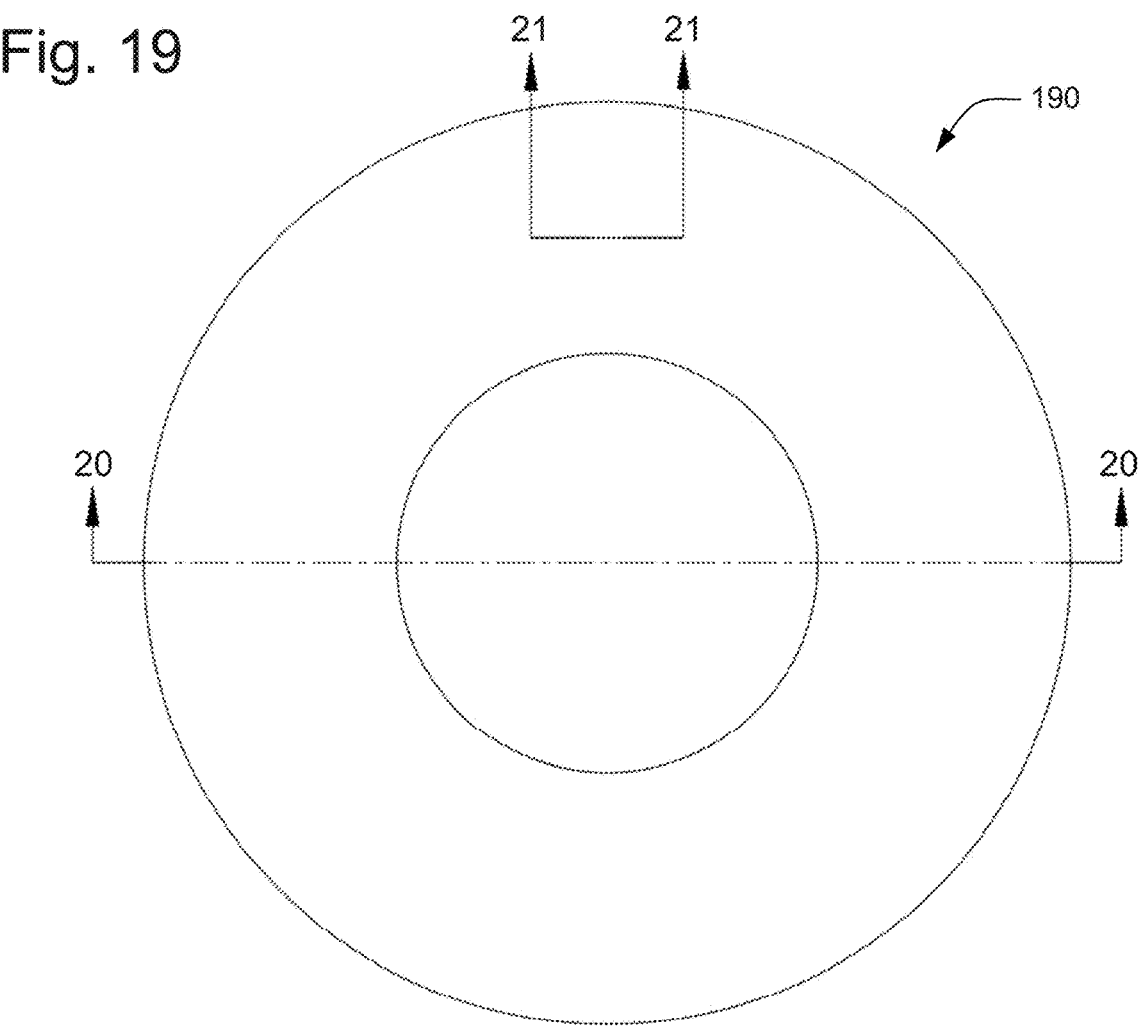
FIG. 19 is a top view of an assembly which is used to form a winding into a desired shape according to an embodiment of the invention, shown just subsequent to the forming and encapsulation stages of the process.
Figure 20:
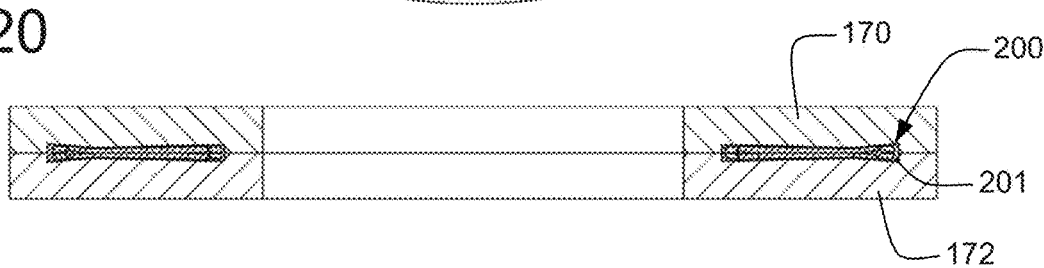
FIG. 20 is a cross-section of the assembly of FIG. 19 along the line 20-20 thereof.
Figure 21:
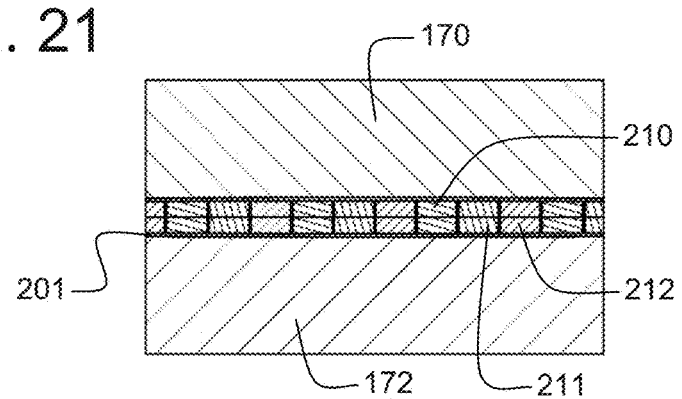
FIG. 21 is an enlarged cross-section of the assembly of FIG. 19 along the line 21-21 thereof, illustrating the approximately rectangular shape into which the bundles have been formed, without a gap between adjacent phases.

Referring now to FIG. 19, the pressed forming assembly 190 is shown which corresponds to the un-pressed forming assembly 160 after the pressing process and encapsulation process have been performed. The lines 20-20 and 21-21 in FIG. 19 define the cross-sections of FIG. 20 and FIG. 21 respectively. As shown in FIG. 20, the two dies 170 and 172 have now been pressed together, such that the gap 173 has been closed and no longer exists. The formed and encapsulated winding 200 now has the desired tapered shape with minimal excess encapsulant 201. As shown in FIG. 21, the three phases 210, 211 and 212 now have rectangular cross sections and there is no gap between them.

Figure 22:
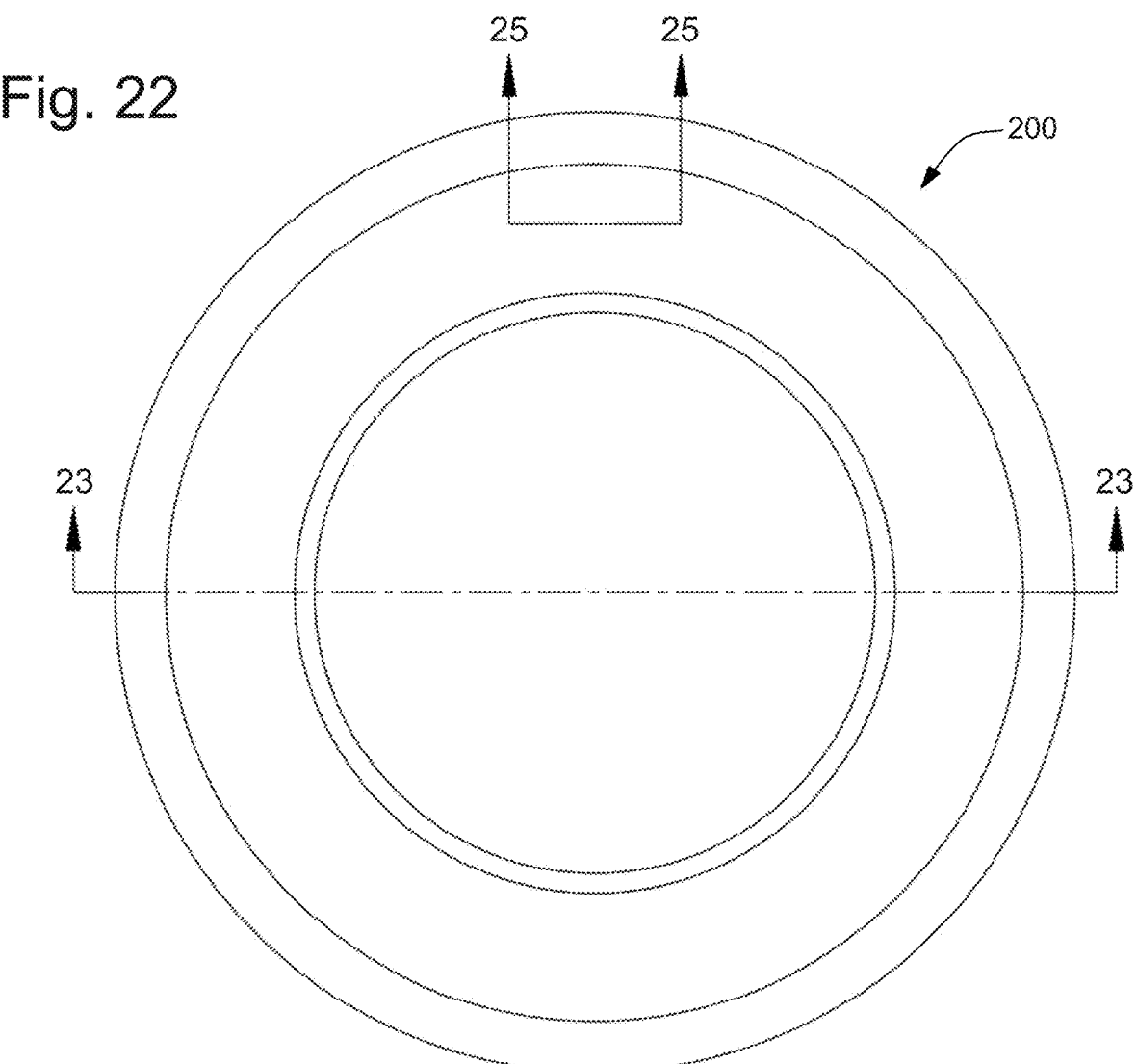
FIG. 22 is a top view of a formed and encapsulated winding in which a large portion of the volume is filled with conductive strands and a small portion is filled with encapsulant or gaps.
Figure 23:
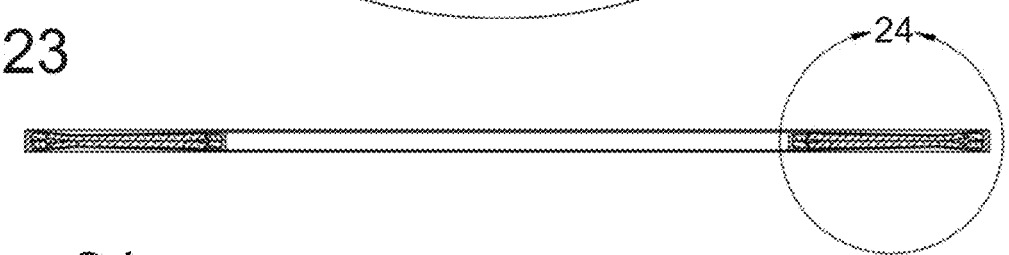
FIG. 23 is a cross-section of the winding of FIG. 22 along the line 23-23 thereof.
Figure 24:
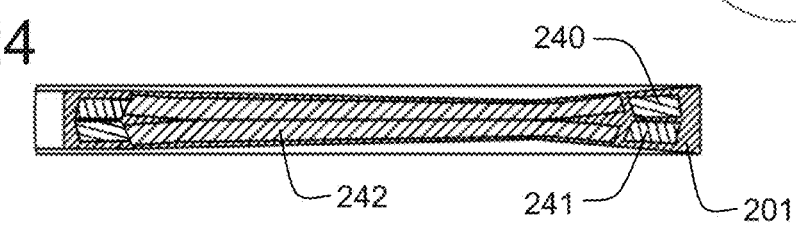
FIG. 24 is an enlarged cross-section of the winding of FIG. 23 along the line 24-24 thereof, illustrating the high ratio of volume which the bundles occupy.

Referring now to FIG. 22, the formed and encapsulated tapered winding 200 is shown after it has been removed from the dies 170 and 172. The lines 23-23 and 25-25 in FIG. 22 define the cross-sections of FIG. 23 and FIG. 25 respectively. The line 24-24 in FIG. 23 defines an additional FIG. 24. As shown in FIG. 24, the phase bundle has been presses such that the thickness on the left-hand side is larger than the thickness on the right-hand side. Furthermore, the aspect ratio between the thickness and the width of the bundle varies along its length in such a way as to maximize the amount of conductive material in the winding and minimize the amount of encapsulant. The two other phases 240 and 241 are shown as they cross over the phase 242 which is cut by the viewing plane in the end turns. Only a small amount of excess encapsulant 201 remains.

Figure 25:
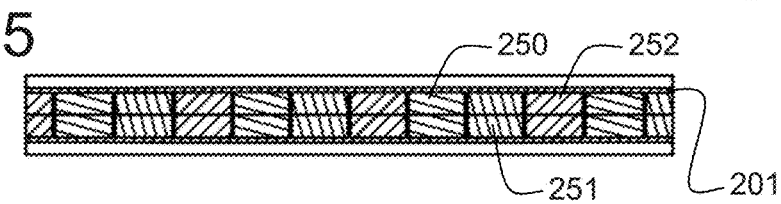
FIG. 25 is an enlarged cross-section of the winding of FIG. 22 along the line 25-25 thereof, illustrating the high ratio of volume which the bundles occupy and the lack of gaps between adjacent phases.

Referring now to FIG. 25, the cross-sectional shapes of the three phases 250, 251 and 252 have retained their formed shape due to the adhesion of the encapsulant after having been removed from the dies 170 and 172. The three phases 250, 251 and 252 have an approximately rectangular shape with only a minimal amount of space between them occupied by serving and excess encapsulant material. Only a small amount of encapsulant 201 remains on the top and bottom surface and in between the phases.

While the windings described up to this point, the winding with cooling channels 130 and the tapered winding with maximal conductive material 200, both have a flat and disk-like form which is suitable for use in axial-flux electrical machines, alternative embodiments of the invention include cylindrical windings which would be suitable for radial-flux electrical machines. Still further embodiments of the invention include windings with a conical shape which are suitable for conical-flux electrical machines.

Some of the steps, shapes and features described above and depicted in FIG. 7 through 25 can be rearranged or interchanged to produce variations in the process and finished product. All of these variations are alternative embodiments of the invention.

Figure 26:
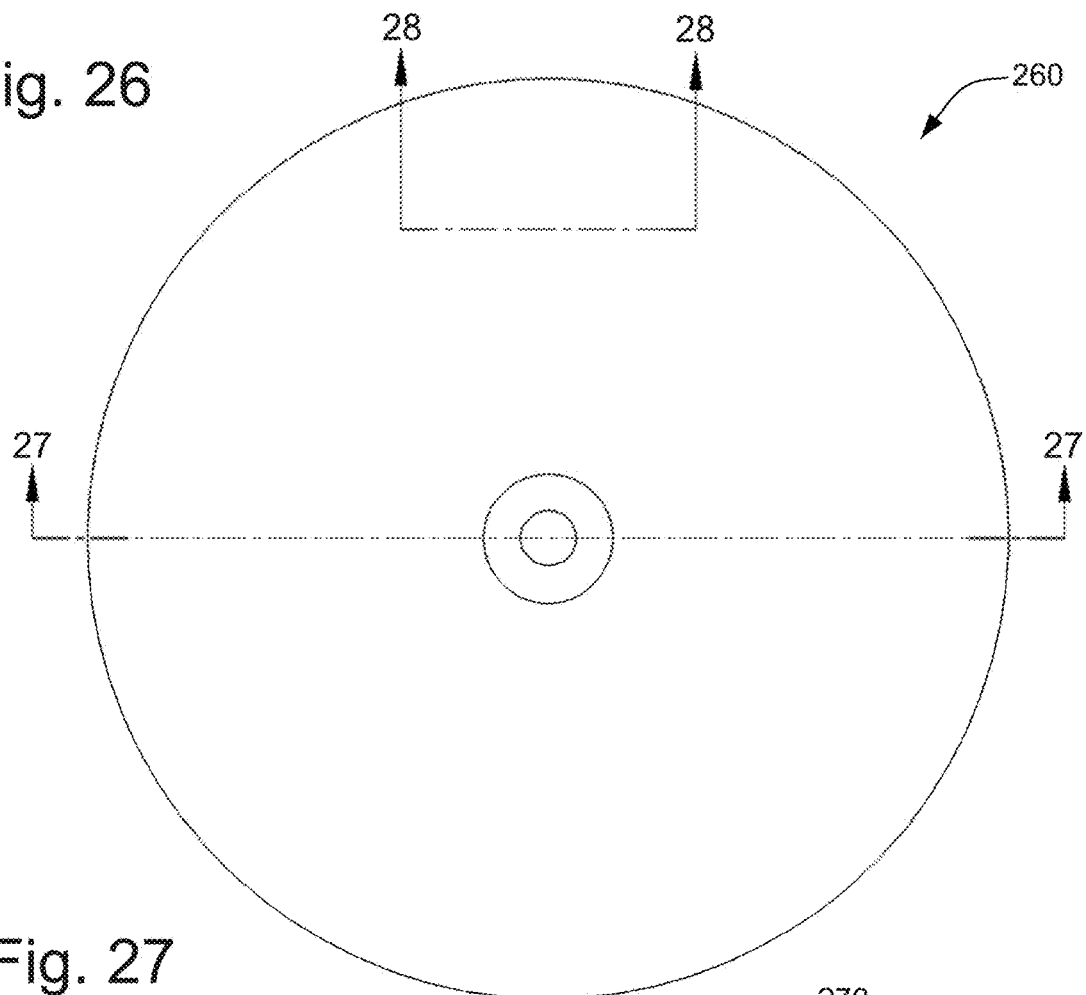
FIG. 26 is a top view of an electrical machine according to an embodiment of the invention, which consists of magnet arrays and a formed and encapsulated winding according to an embodiment of the invention.
Figure 27:
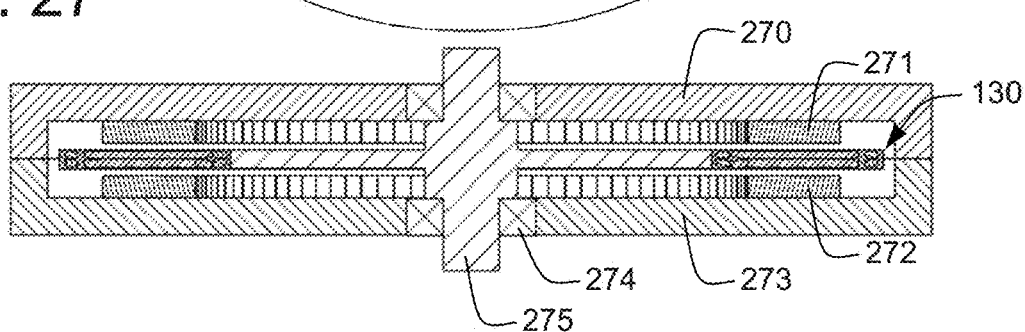
FIG. 27 is a cross-section of the electrical machine of FIG. 26 along the line 27-27 thereof, which illustrates the relative placement of the winding and magnet arrays, among other components according to an embodiment of the invention.

Referring now to FIG. 26, an electrical machine 260 is depicted. The lines 27-27 and 28-28 define the cross-sections of FIG. 27 and FIG. 28 respectively. According to a preferred embodiment of the invention, the machine 260 consists of a formed and potted winding 130 which is a component of the stator 275 which consists of all of the parts which are stationary during operation of the machine. The rotor consists of all of the parts which rotate during operation of the machine, which are the housings 270 and 273 and magnet arrays 271 and 272. The rotor and stator are connected by means of a bearing 274.

Figure 28:
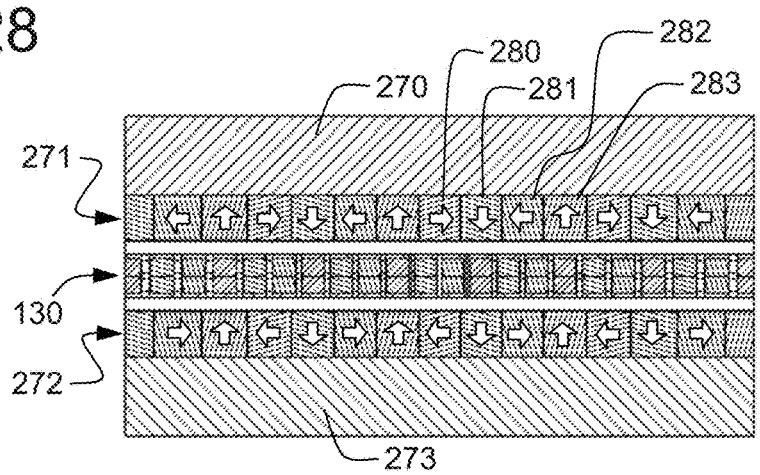
FIG. 28 is an enlarged cross-section of the electrical machine of FIG. 26 along the line 28-28 thereof, which illustrates the orientation of magnets within the magnet arrays, according to an embodiment of the invention.

Referring now to FIG. 28, the magnetic orientation of the individual magnets of the magnet arrays 271 and 272 are shown with block arrows. The magnet arrays consist of a repeated pattern of four magnet orientations 280, 281, 282 and 283. Each repeated section of magnets is referred to as a "cycle". The relative angle of orientation of one magnet with respect to the adjacent magnets is 90 degrees. This type of magnet array is sometimes referred to as a Halbach array.

While the electrical machine 260 is shown with a winding 130 which includes cooling channels, an alternative embodiment of the invention would replace it with a tapered winding 200 or any other winding variation that is itself an embodiment of this invention. Also, while the electrical machine 260 is shown with a magnet array with four magnets per cycle, an alternative embodiment of the invention would use an array with 6 magnets per cycle with an angle increment between magnets of 60 degrees. Another alternative embodiment of the invention would use an array with 8 magnets per cycle with an angle increment between magnets of 45 degrees. Further alternative embodiments are possibly by making similar variations on the number of magnets per cycle.

In FIG. 28, while each of the 4 magnets in each cycle are shown as having similar size, an alternative embodiment of the invention consists of magnet arrays which have some magnets in each cycle larger than others. By varying the size of the magnets, the shape of the magnetic field can be changed from approximately sinusoidal to approximately trapezoidal. In some applications, an electric machine with trapezoidal magnetic field will have reduced ripple torque.

Figure 29:
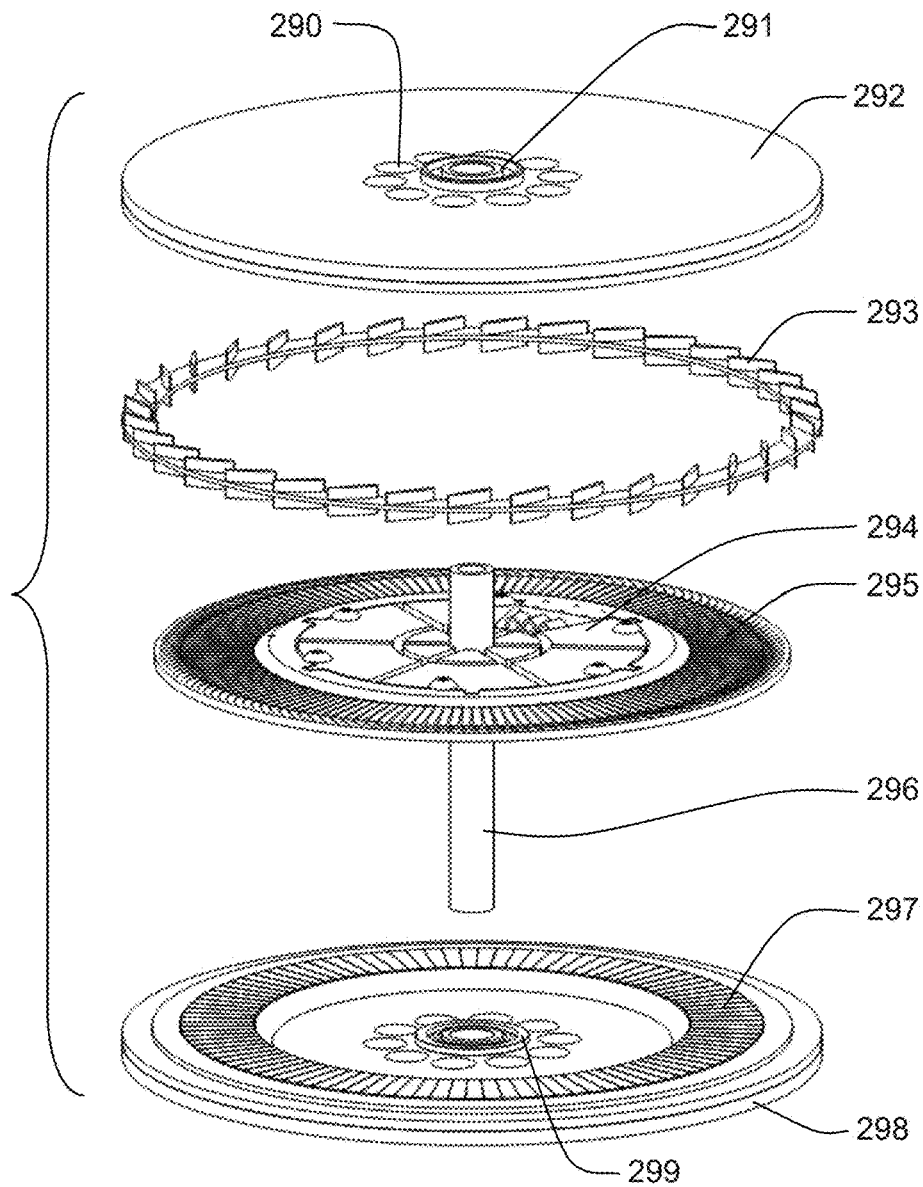
FIG. 29 is an exploded perspective view of an electrical machine according to an embodiment of the invention which includes impellers which pull surrounding air through the device in order to aid cooling.

Referring now to FIG. 29, an exploded view of a preferred embodiment of the invention is depicted. This embodiment is similar to that of the electrical machine 260 with variations that improve the cooling performance of the device. The rotor of the machine consists of magnet arrays mounted to backing plates 292 and 298, and an impeller ring 293. The stator consists of a winding 295 which is mounted to a hub 294 which is mounted to a stationary shaft 296. The rotor is connected to the stator by means of bearings 291 and 299 which allow rotational motion between the rotor and stator. During operation of the machine, a pressure differential is generated across the impeller ring 293 which pulls surrounding air into the machine through inlet holes 290. The airflow aids the cooling of the machine by means of forced convection.

In an alternative embodiment of the invention, the hub 294 is comprised of a circuit board with the electronic components required to drive the machine. Using the hub as a circuit board reduces weight by giving the hub a dual use and it also allows the cooling air being pumped through the machine to be used to cool the electronic components.

Figure 30:
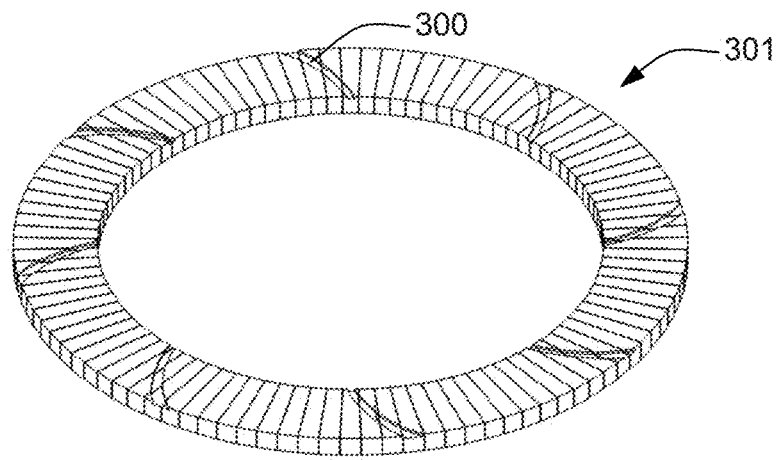
FIG. 30 is a perspective view of a magnet array whose magnets include features which act as impeller features to pull surrounding air through to device to aid cooling.

In an alternative embodiment of the invention, the magnet array with smooth surface 297 is replaced with a magnet array 301 which has impeller features 300 in its face as shown in FIG. 30. The impeller features can be manufactured by removing material from the magnets, or they can be manufactured by adding a material such as epoxy or plastic to the face of the magnets.

Figure 31:
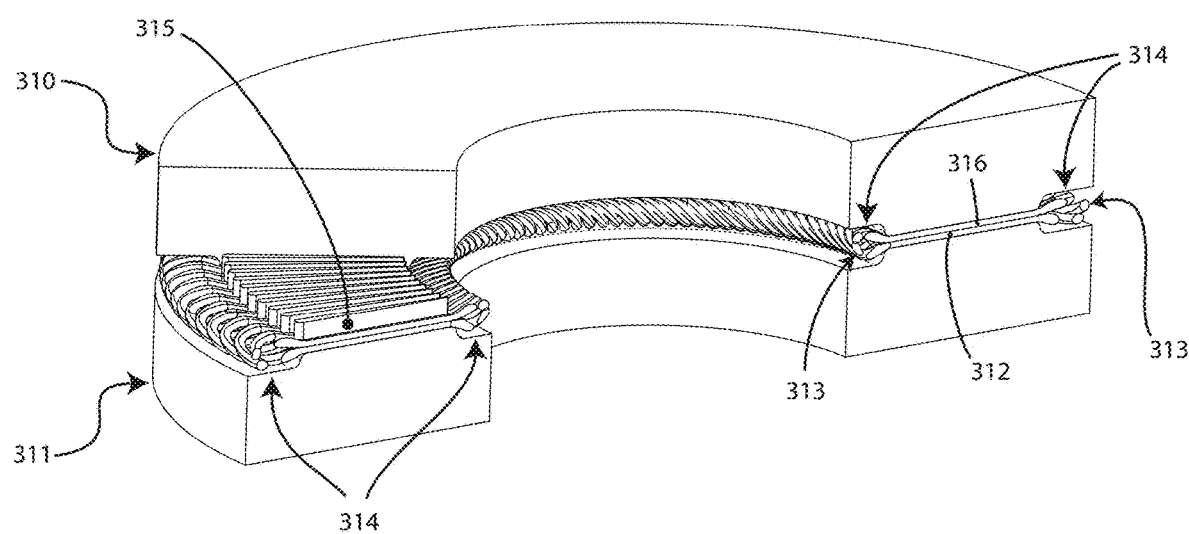
FIG. 31 is a sectioned perspective view of forming tooling that forms rectangular phase legs and includes reliefs so that the winding end turns remain unformed.

FIG. 31 shows an alternative embodiment of the invention where the toothed die 311 and the smooth die 310 have reliefs in them 314 such that when the multi-layer overlapping winding assembly made from type 2 Litz wire is pressed only the active leg areas of the winding 312 have pressure applied and the end turns 313 are not pressed or formed by the die. In other words, the end turns 313 are uncompressed and remain in an uncompressed state after winding manufacture. In contrast, the active leg areas are in a compressed state (i.e., pressed and formed) after winding manufacture. This feature minimizes the chances of a short circuit being generated between the end turns since they are not pressed together with any force during the forming operation and also minimizes conductive strand breakage within the Litz bundle since the end turns are not forced into a tight bend. Note that the smooth die 310 also has narrow pockets cut in the face that are the negative of the fins 315, allowing the smooth die forming surface 316 to be pressed below the height of the top of the fins. Each active leg location 512 around the winding is known as a slot position.

Figure 32:
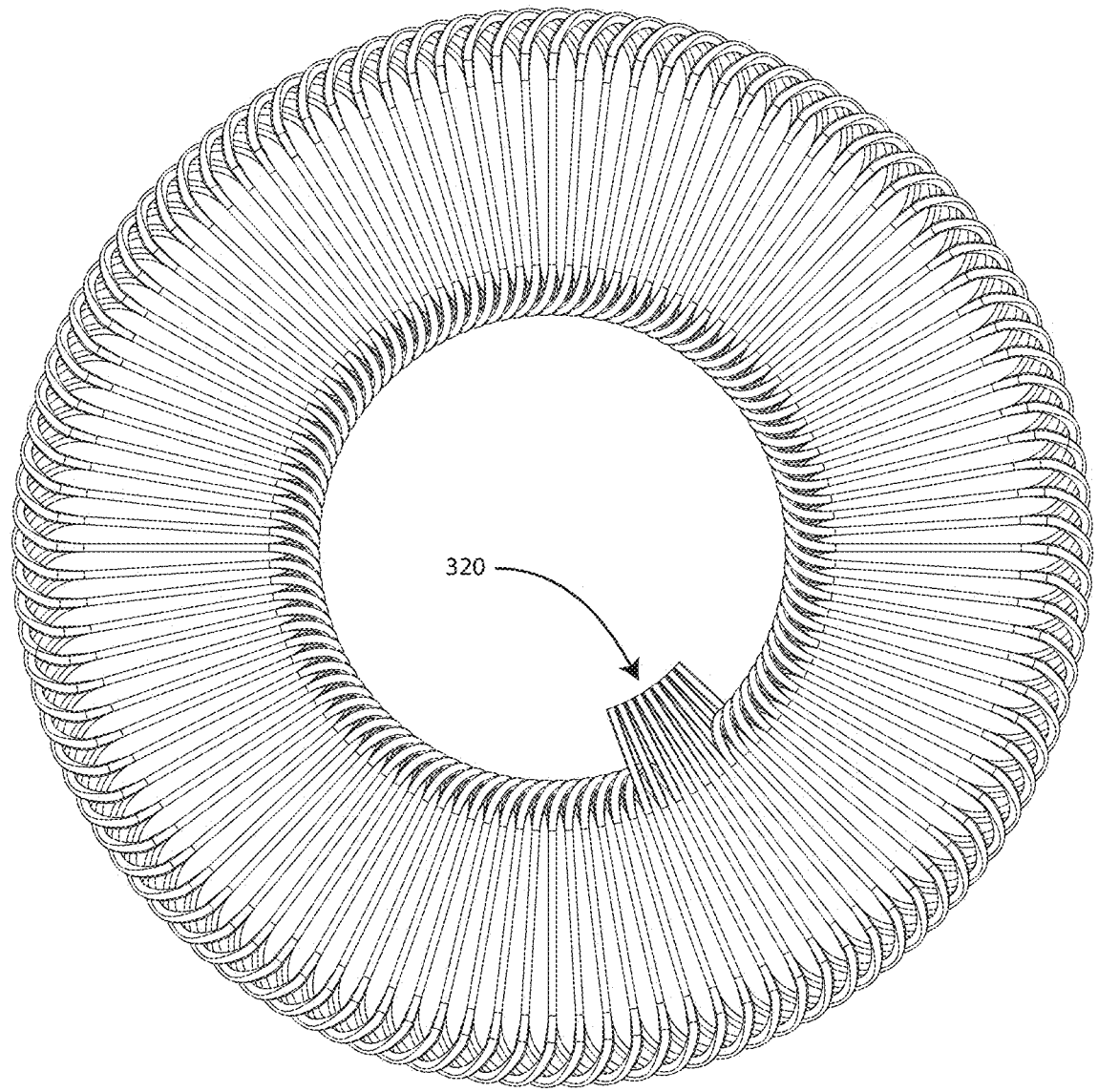
FIG. 32 is a top view of a winding with formed rectangular cross-section conductor phase legs and unformed round cross section conductor end turns.
Figure 33:
FIG. 33 is a section through the middle of the winding from FIG. 32.

The resulting winding has the form shown in FIG. 32 and in cross section FIG. 33. Conductor terminals 320 are terminated to each other and external power connectors to complete the winding as a wye, delta, or isolated phase machine.

Figure 34:
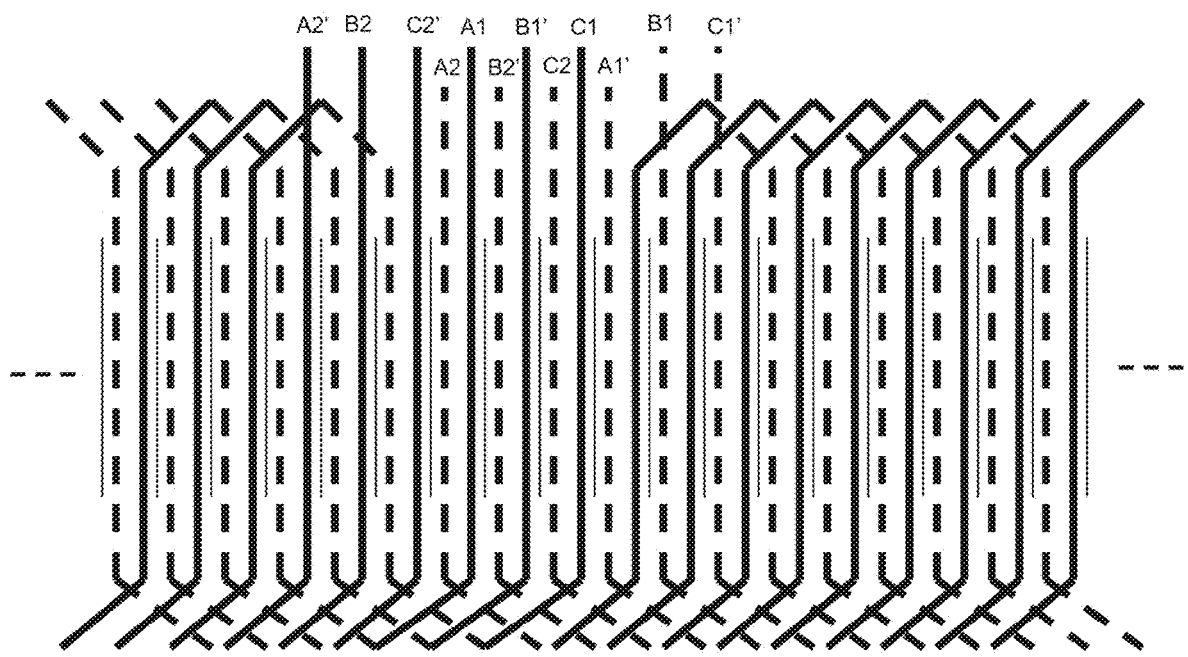
FIG. 34 is one of many possible winding and termination patterns for the winding in FIG. 32.

FIG. 34 is a winding belt diagram for one of many possible winding constructions for a three phase winding. Other constructions for different terminations, different phase counts, different numbers of layers, and different numbers of slot positions per phase are also possible.

Figure 35:
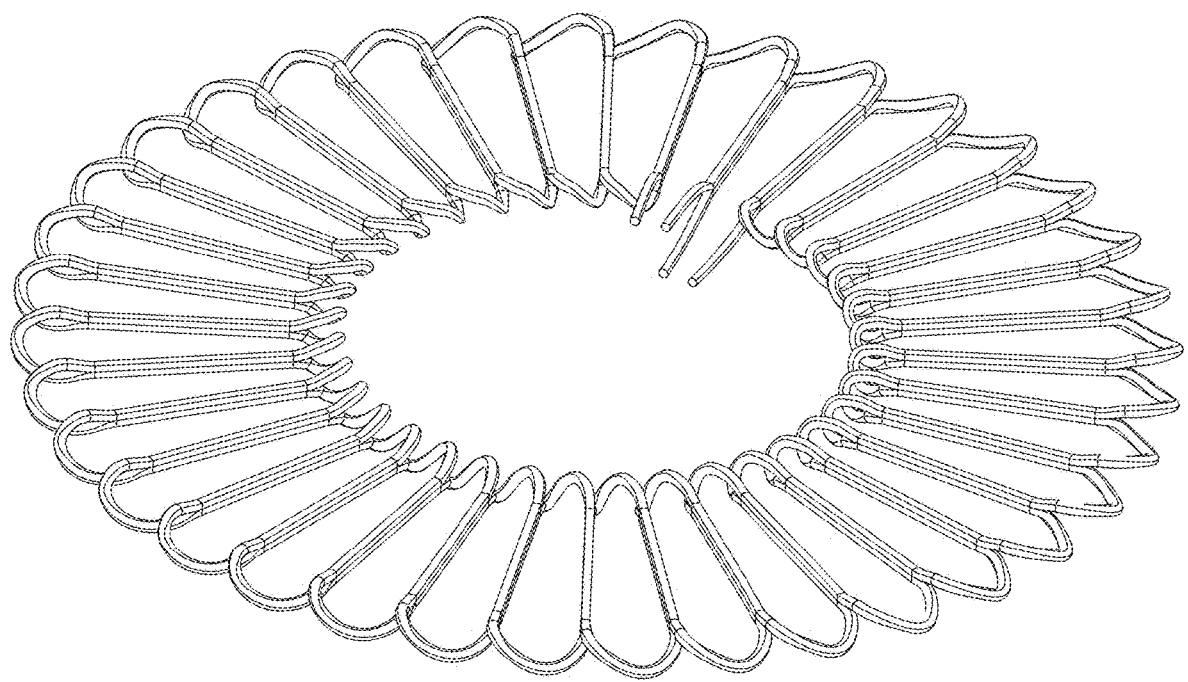
FIG. 35 is a perspective view of a single isolated phase consisting of two conductors from the winding of FIG. 32.
Figure 36:
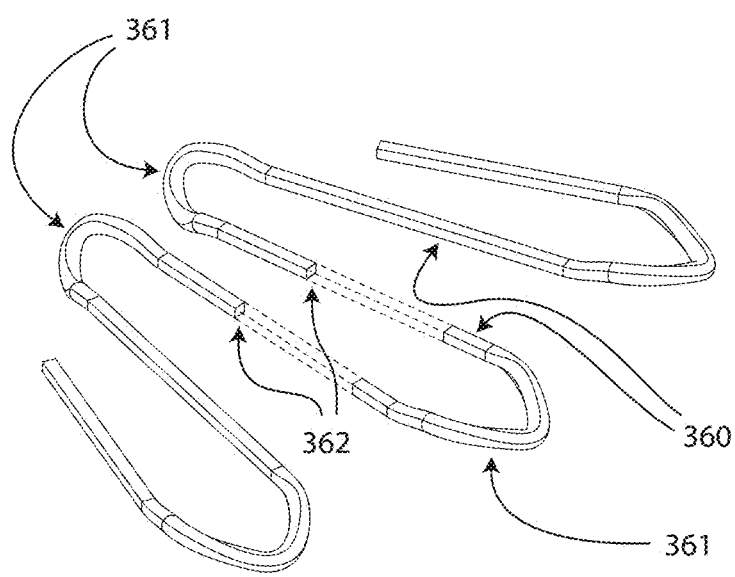
FIG. 36 is a cut away expanded section view of one of the conductors in FIG. 35 showing the rectangular conductor cross section in the phase leg.
Figure 37:
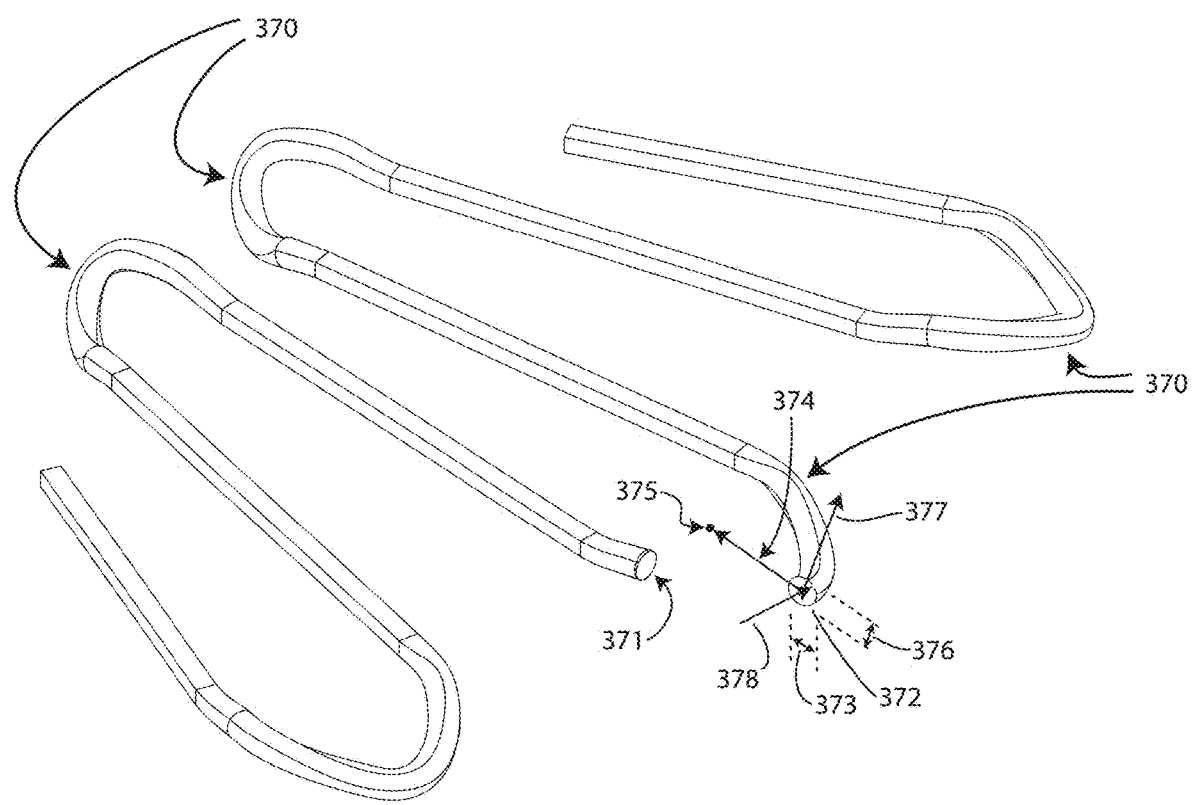
FIG. 37 is a cut away expanded section view of one of the conductors in FIG. 35 showing the round conductor cross section in the end turns.

FIG. 35 shows the conductors for one phase of the winding in FIG. 31 isolated for clarity. It is to be understood that each of the two conductors alternate between the top layer and the bottom layer as they wind around the stator. The two conductors alternate between top and bottom layers in opposite sequence to ensure that each slot position in the winding has both an upper and lower conductor. FIG. 36 shows a detail of the winding legs 360 and the end turns 361 for one conductor in the winding. In the compressed active leg area 360 of the winding, the round Litz conductors are formed into rectangular sections 362 with a high packing factor which improves the electromagnetic efficiency of the motor incorporating this winding. In FIG. 37, it can be seen that the Litz conductors in the uncompressed end turns 370 have approximately circular cross section 371 throughout the entire end turn portion of the winding. Due to the natural compliance of the type 2 Litz wire bundle, the cross section may deviate from circular and flatten (though still uncompressed), becoming slightly ellipsoidal 372. The minor dimension of the ellipse 373 will be approximately coincident with the vector 374 from the conductor centerline to instantaneous center of curvature of the conductor 375 and the major diameter of the ellipse 376 will be approximately parallel with a vector 377 perpendicular to the conductor instantaneous center of curvature vector 374 and the conductor path tangent vector 378. In accordance with the present invention, conductors within the end turn portion have an approximately circular conductor cross section that deviates from a circle to an ellipse by up to 20% between major and minor axes thereof, and the minor axis is approximately coincident with a vector representing an instantaneous center of curvature of the conductors within the end turn portion.

Figure 38:
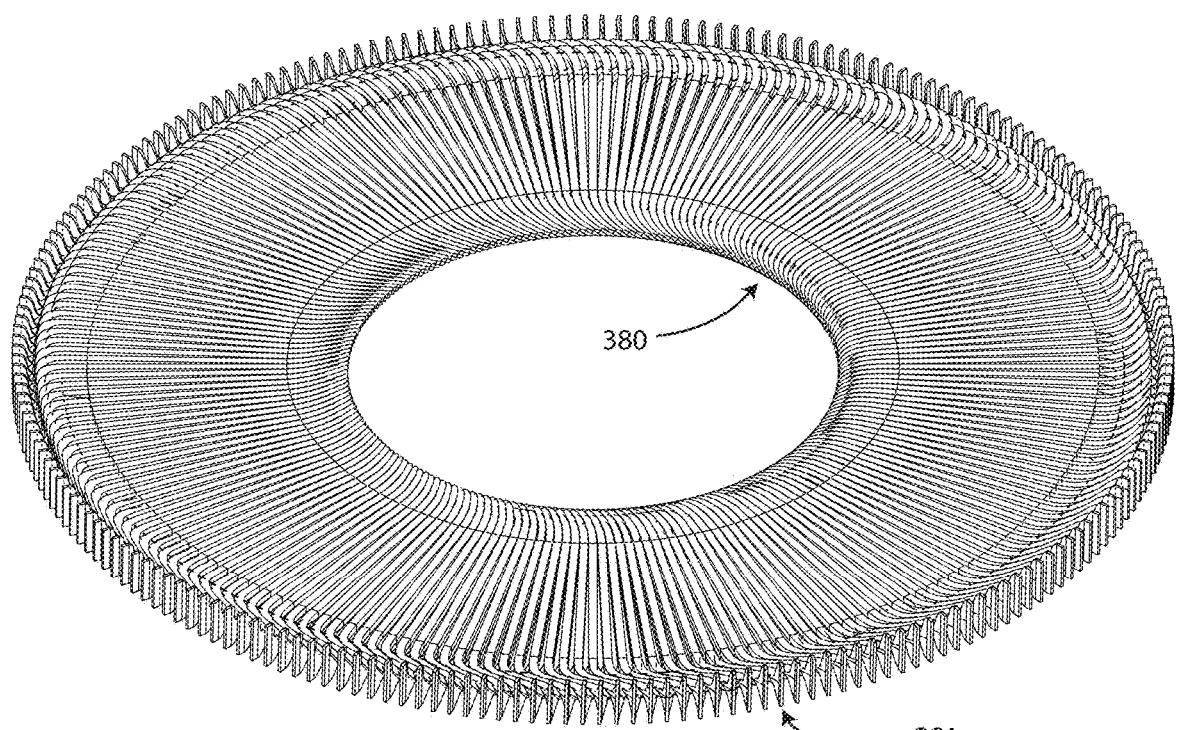
FIG. 38 is a perspective view of a winding combined with end-turn cooling fins to aid cooling.
Figure 39:
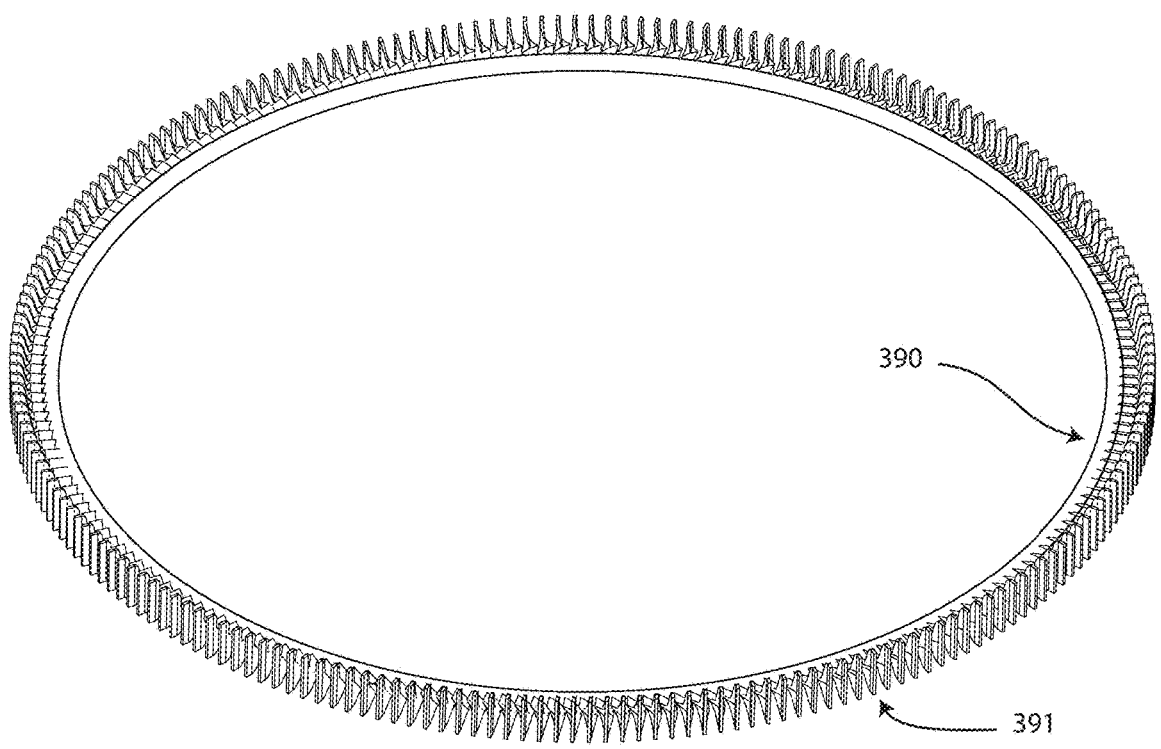
FIG. 39 depicts an end-turn cooling fin structure separate from the winding of FIG. 31.
Figure 40:
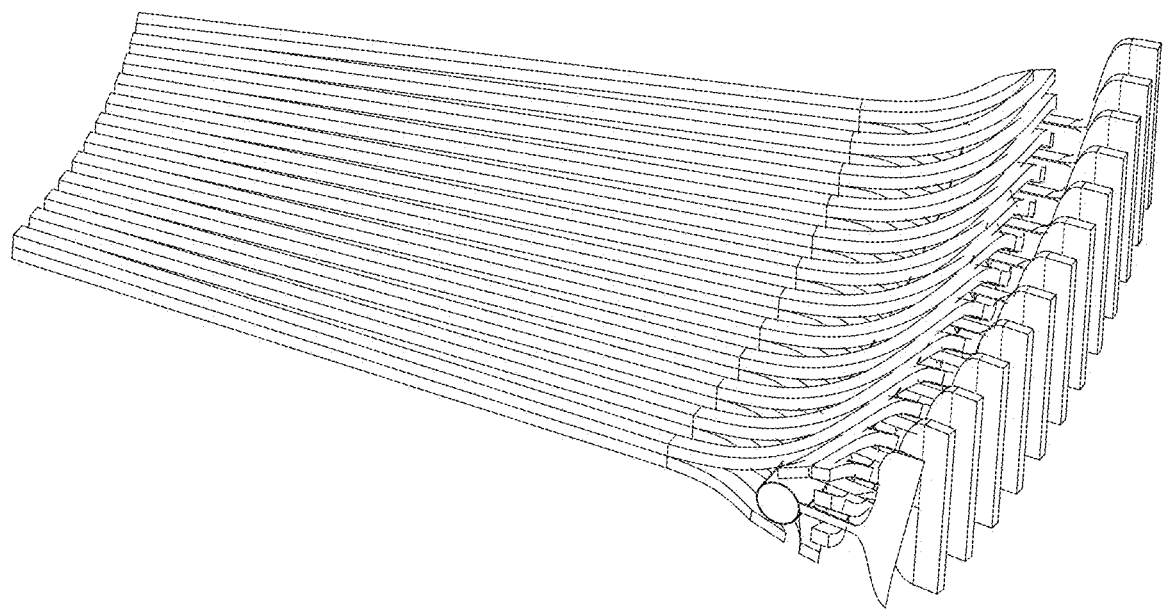
FIG. 40 is an expanded view of a section of the winding with end turn cooling fins shown in FIG. 38.
Figure 41:
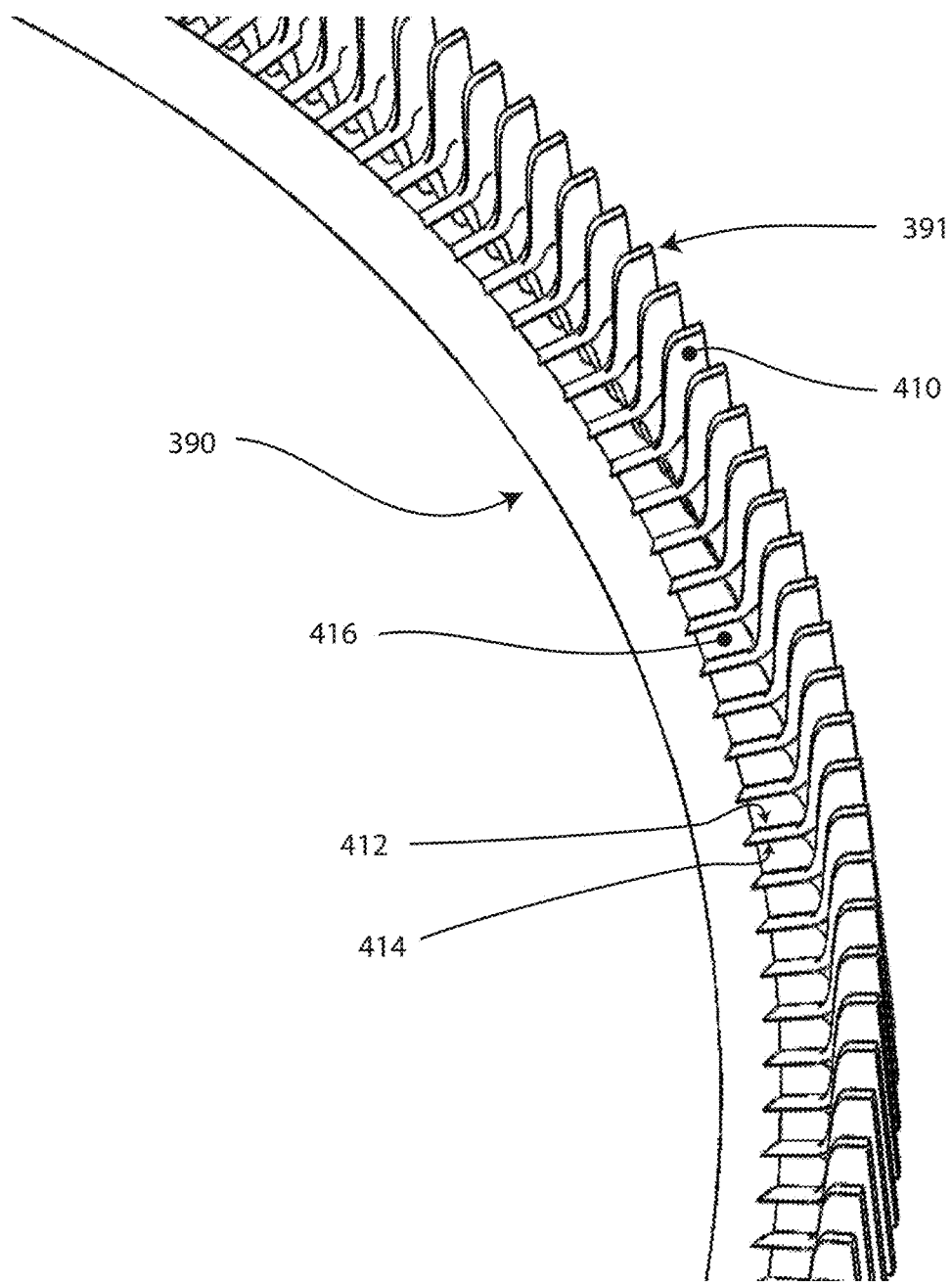
FIG. 41 is an expanded view of a region in FIG. 39.
Figure 42:
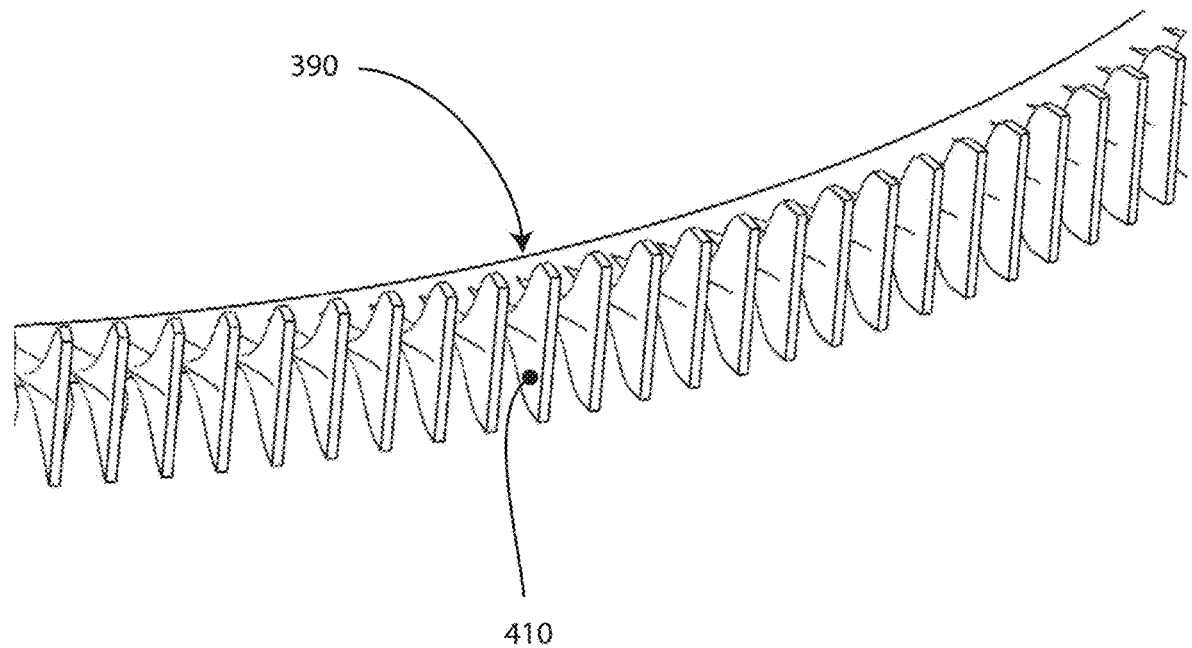
FIG. 42 is another expanded view of a region in FIG. 39 from an edgewise perspective.

Yet another embodiment of the invention incorporates end-turn cooling fins as depicted in FIG. 38. In FIG. 38 the phase terminals are not shown, but can be similar to those of FIG. 2. Attached to winding 380 are many cooling fins of the type indicated by the label 381 consisting of a thermally conductive material. The fins extend into the winding between end-turns to improve heat transfer. The fins are subjected to a high velocity air stream entrained by the nearby machine rotor and enhance cooling of the winding by providing increased area for the heat to be convected to the ambient air. One construction of the cooling fins is shown in FIG. 39 where the cooling fins of the type 391 are attached to a thermally conductive core 390. An expanded view of a portion of FIG. 39 is shown in FIG. 41. Additional features shown in FIG. 41 are an air-contacting region of a cooling fin 410 and end-turn contacting regions of the cooling fin 412 and 414. The winding conductor end-turn loops wrap around and contact the core 390 extending through the end turn loops. The entire assembly is encapsulated with polymer so that the encapsulant fills the voids between the conductor and the core and fins. The core conducts heat from the winding to the cooling fins and subsequently to the ambient air. Passage 416 is the path of an end-turn through the fins. The design of FIGS. 39 and 41 greatly enhances the heat transfer from the motor windings. FIGS. 40 and 42 depict yet other expanded views of portions of FIG. 38.

Figure 43:
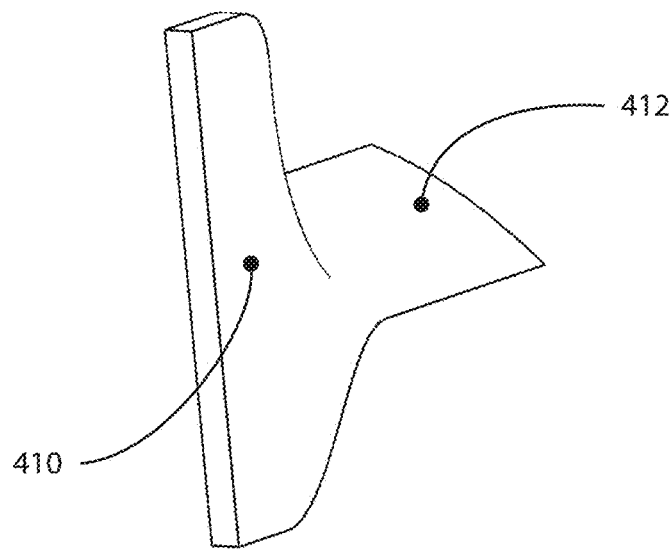
FIG. 43 depicts an end-turn cooling fin as a discrete component in contrast to the structure of FIG. 39.
Figure 44:
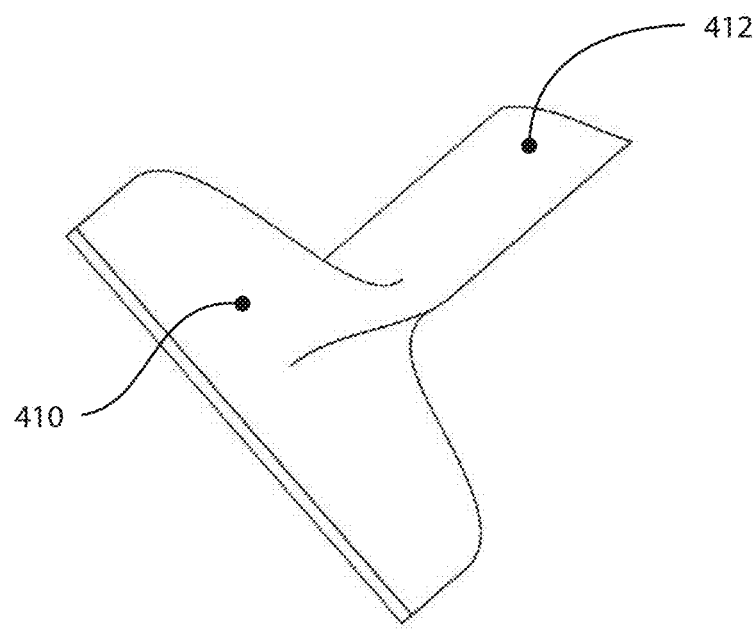
FIG. 44 depicts another embodiment of and end-turn cooling fin as a discrete component.

The cooling fins need not be attached to a core to form a single component. Rather, they can be discrete components which are bonded in between the end turns to form a winding with fins of the form shown in FIG. 38. FIGS. 43 and 44 depict such fins where the relative angle between the end-turn contacting surface 412 and the air contacting surface 410 may be varied to optimize heat transfer from the winding to the air. Angular variations other than those shown may also be possible without straying from the intended scope of the present invention. The fins may be in thermal contact with the end turns at the outside diameter of the winding, in thermal contact with the end turns at the inside diameter of the windings, or in thermal contact with the end turns at both the inside or outside diameters of the winding. In this embodiment, it is shown that the core and fins are manufactured separately from the Litz wire which is then wound around the core and fins, but the structures may also be created in one unitary process using multi-material 3D printing or additive manufacturing processes.

Figure 45:
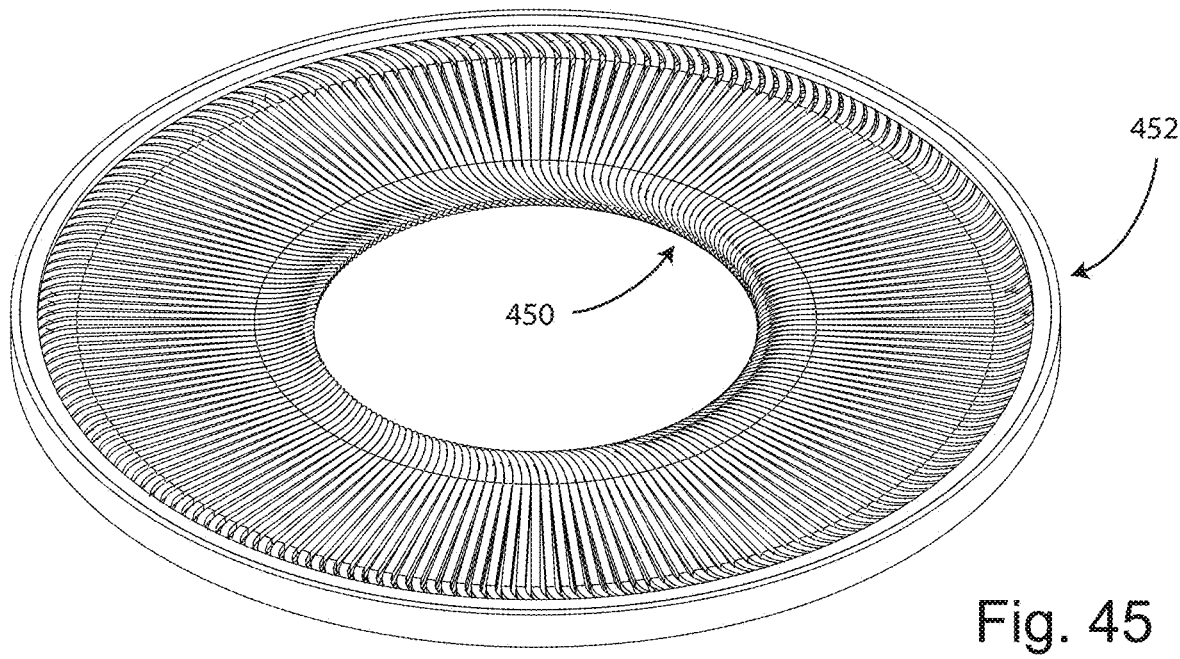
FIG. 45 depicts a winding combined with an end-turn cooling ring for improved heat transfer.
Figure 46:
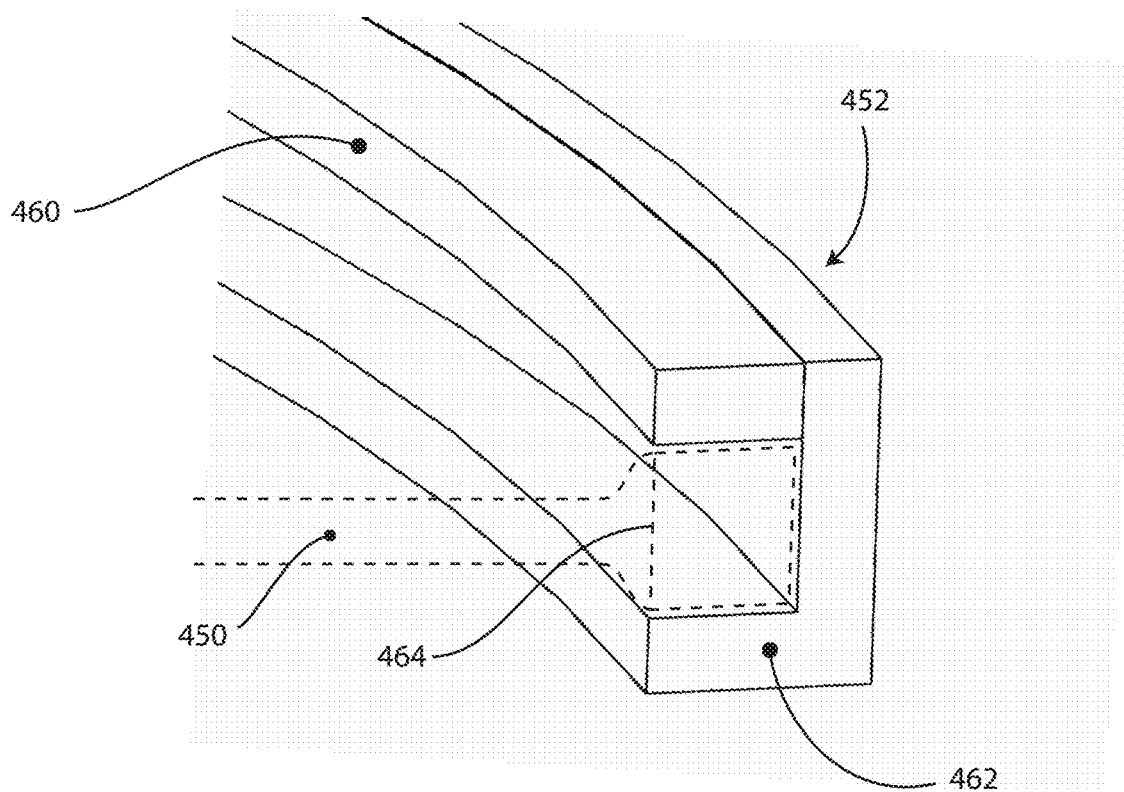
FIG. 46 shows an expanded section view of the end-turn cooling ring of FIG. 45.
Figure 47:
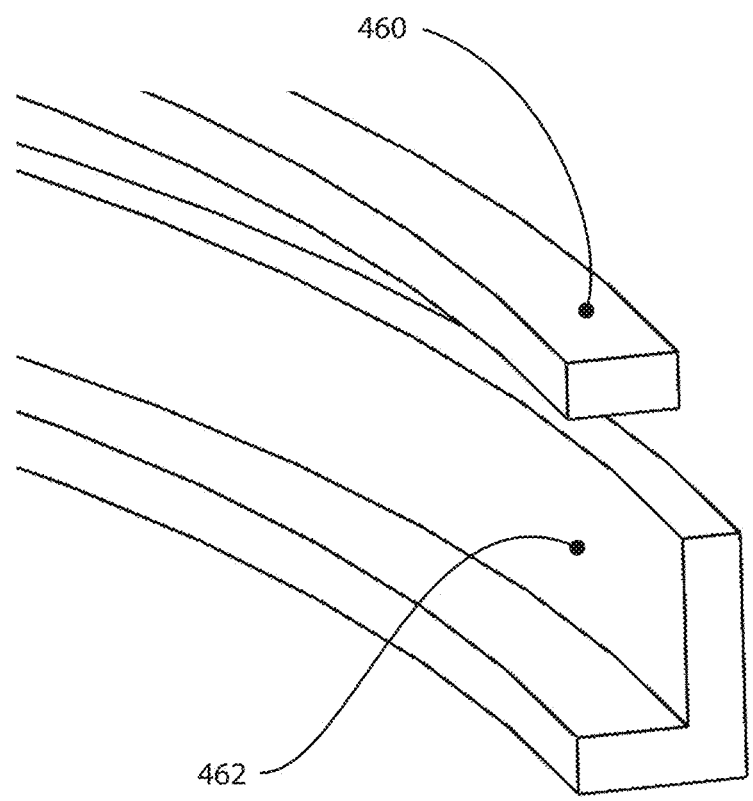
FIG. 47 shows the end-turn cooling ring as in FIG. 46 with the two components disassembled.

FIG. 45 depicts yet another embodiment of the invention in which a cooling ring 452 is placed in thermal contact with the end turns of the winding 450 to provide a heat transfer path through the cooling ring. The cooling ring provides addition convective cooling surface area and may be placed in thermal contact with an air-cooled heat sink having fins or pins or in thermal contact with a water-cooled heat sink. FIG. 46 details the construction of the cooling ring. The cooling ring 452 is comprised of an L-shaped ring 462 and an annular ring 460 which form a C-shaped region which wraps around the end turn to increase contact area. The end turns of the winding 450 occupy a fraction of the region 464. The ring is placed onto the winding before the encapsulation step that makes the winding rigid. During the encapsulation step the encapsulant fills any voids between the curved ends turns of the winding and the inner surface of the ring to provide a thermally conductive path from the end turns to the ring. As the cooling ring is comprised of two components 460 and 462 these can be pressed together and onto the end turns to improve the thermal contact. FIG. 47 depicts the two components 460 and 462 in a disassembled arrangement. The cooling ring may be in thermal contact with the end turns at the outside diameter of the winding, in thermal contact with the end turns at the inside diameter of the windings, or in thermal contact with the end turns at both the inside or outside diameters of the winding. The winding is still flexible before the encapsulation operation so in an alternative embodiment the ring may be comprised of only a single "C" shaped component and the winding is flexibly inserted into the ring before encapsulation.

Figure 48:
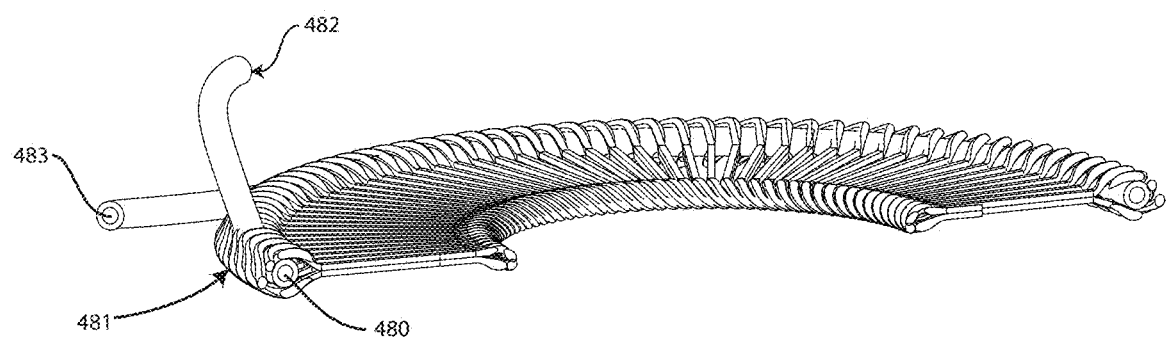
FIG. 48 is a section view of a winding such as FIG. 32 illustrating how the winding may have a coolant tube inserted into the end turns of the winding.

FIG. 48 shows a section view of an alternative embodiment of the invention in which a fluid carrying coolant tube 480 is inserted through each winding end turn loop 481 before the winding is encapsulated. The tube is made of a thermally conductive material including, but not limited to, copper, brass, aluminum, titanium, ceramic, polymer, and stainless steel. The tube may have a smooth bore or it may have grooves to increase the convection coefficient of the inside surface. The winding conductor end turns are pulled tight against the tube during the final forming and encapsulation process ensuring an intimate thermal connection between the end turn loops 481 and the tube 480. The encapsulant fills the gaps and voids where the round wire contacts the tube surface. The tube goes around the circumference of the winding and has terminals 482 and 483 where a coolant may be introduced and then extracted after absorbing heat from the winding through the tube walls.

Figure 51:
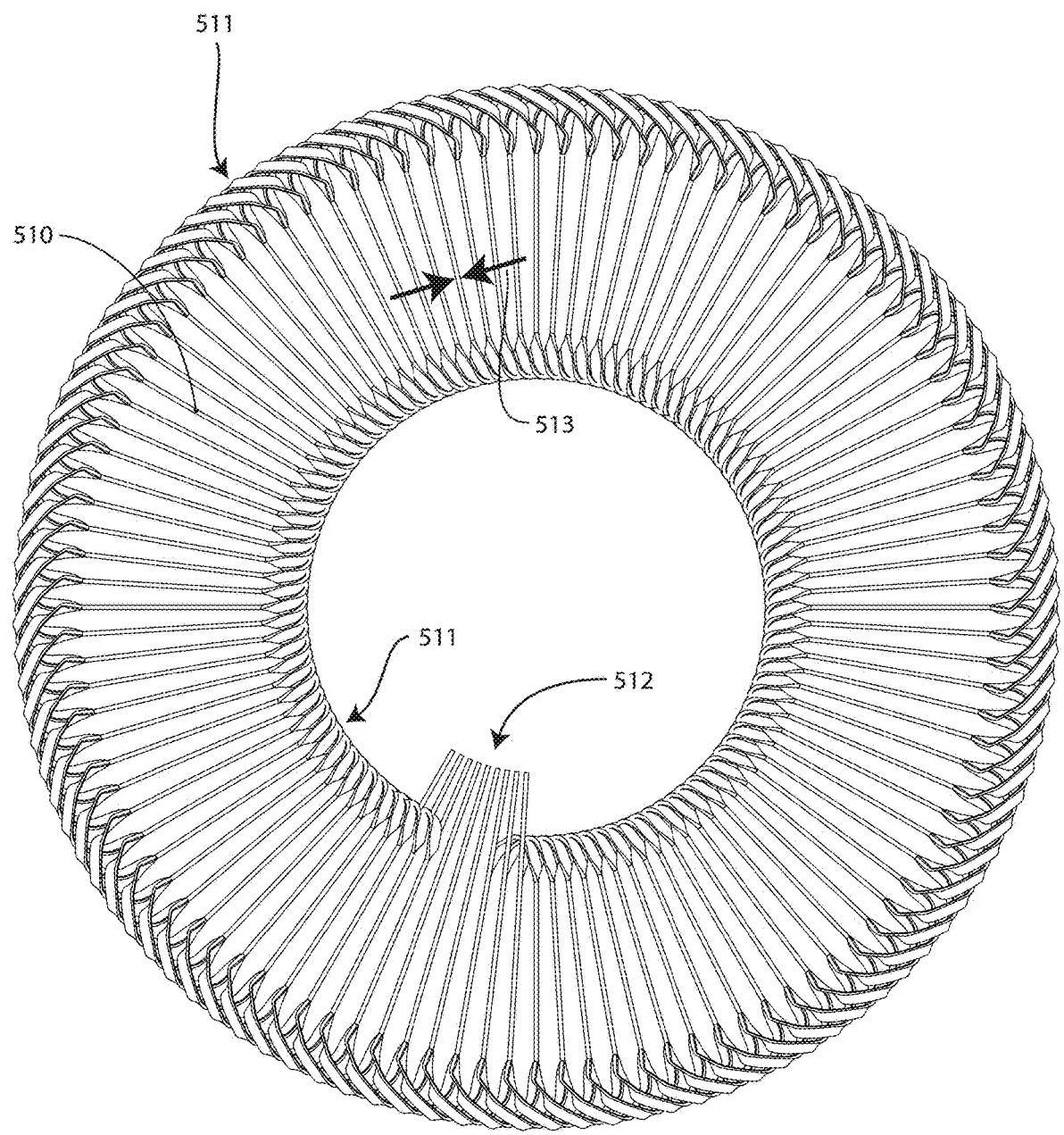
FIG. 51 is a top view of a two-layer winding illustrating how type 7 or type 8 Litz wire may be used to form the multi-layer poly-phase electrical machine winding.
Figure 52:
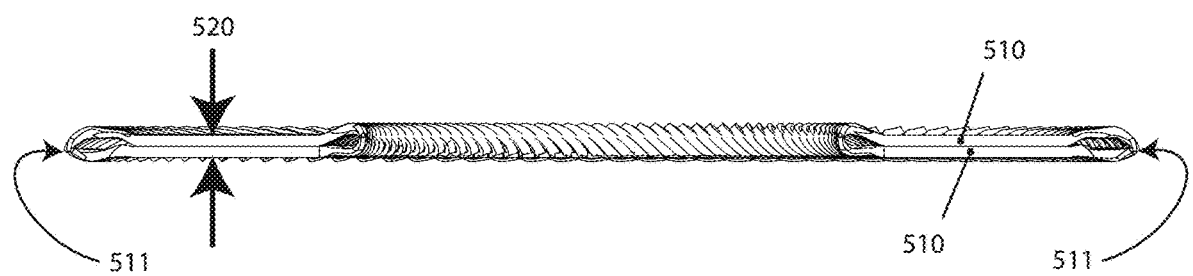
FIG. 52 is a cross section through the winding in FIG. 51.
Figure 53:
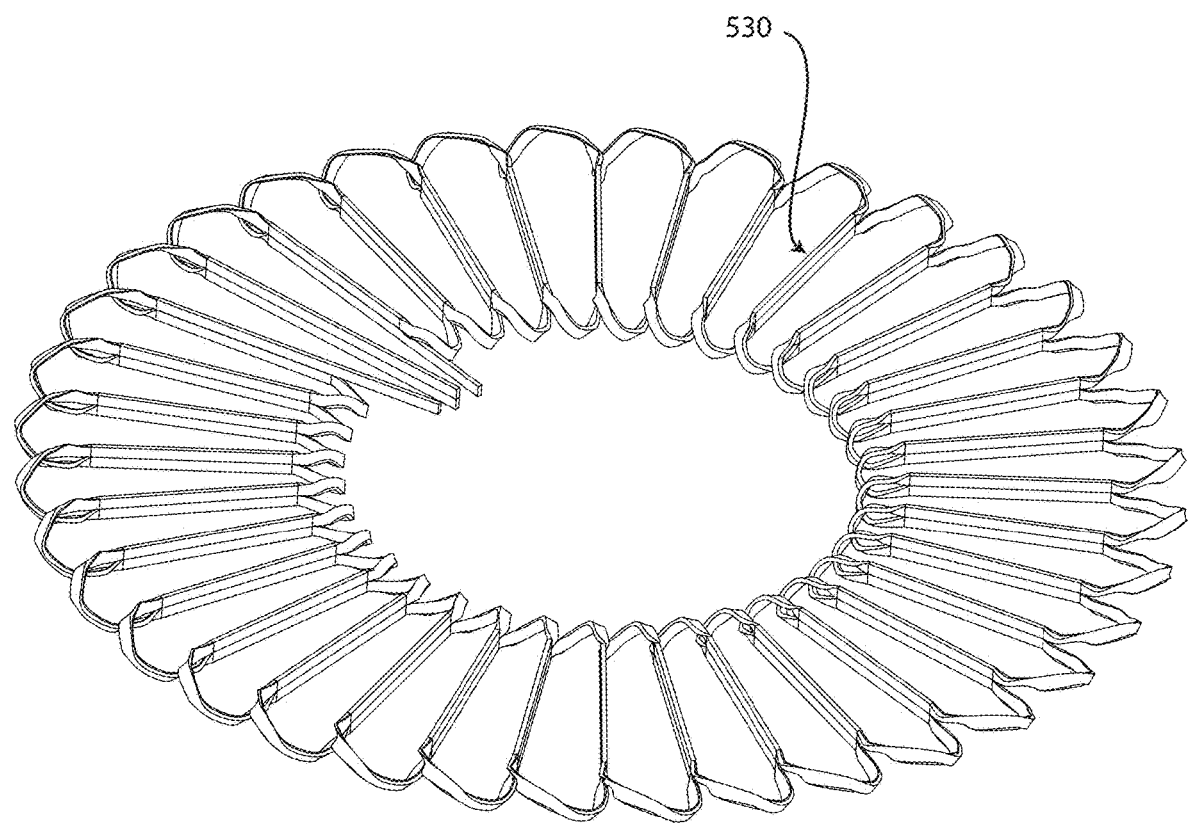
FIG. 53 is a perspective view of a single isolated phase consisting of two conductors isolated for clarity from the winding of FIG. 51.

FIG. 51 shows a top view of an alternative embodiment of the invention in which the multi-layer, poly-phase electrical machine winding is made using rectangular type 7 or type 8 Litz wire. The winding has compressed active leg portions of the conductors 510, uncompressed end turns 511, and terminals 512. Note that the circumferential dimension of the active leg conductor portions 513 is shown reduced for clarity in this illustration to visually increase the spacing between conductors and make the individual conductors distinguishable in the figure. Alternative embodiments may place the terminals on the outside diameter of the winding instead of the inside diameter. FIG. 52 shows a cross section of the winding from FIG. 51 with the axial thickness of the two-layer winding active leg portion shown 520. FIG. 53 shows one phase isolated from the winding of FIG. 51. The phase is constructed with two rectangular type 7 or type 8 Litz conductors 530. It is to be understood that each of the two conductors alternate between the top layer and the bottom layer in opposite sequence as they wind around the stator. This ensures that each slot position in the winding has both an upper and lower conductor. In an alternative embodiment the two conductors may be realized with a single continuous conductor that loops from one of the lower layer terminals to one of the upper layer terminals at the end of the winding.

Figure 54:
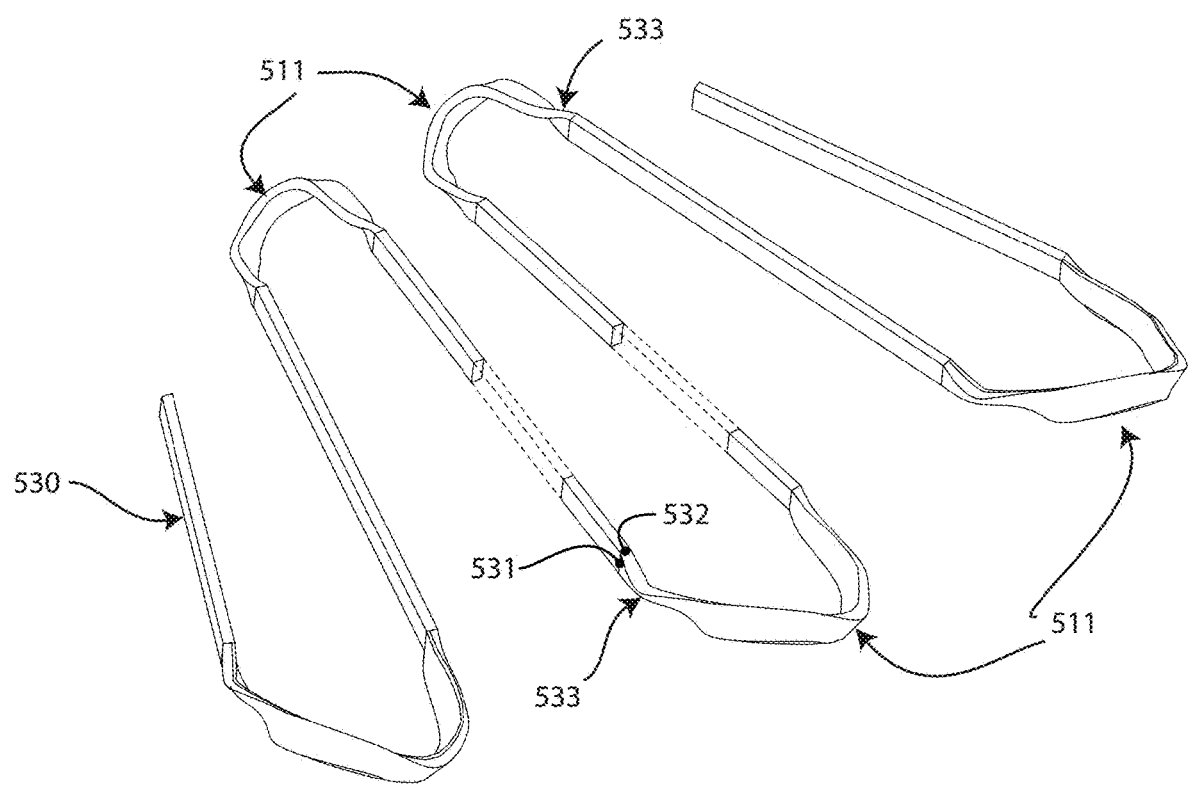
FIG. 54 is an expanded view of part of the conductor in FIG. 53 with a section cut from the phase legs to show the conductor cross sections.
Figure 55:
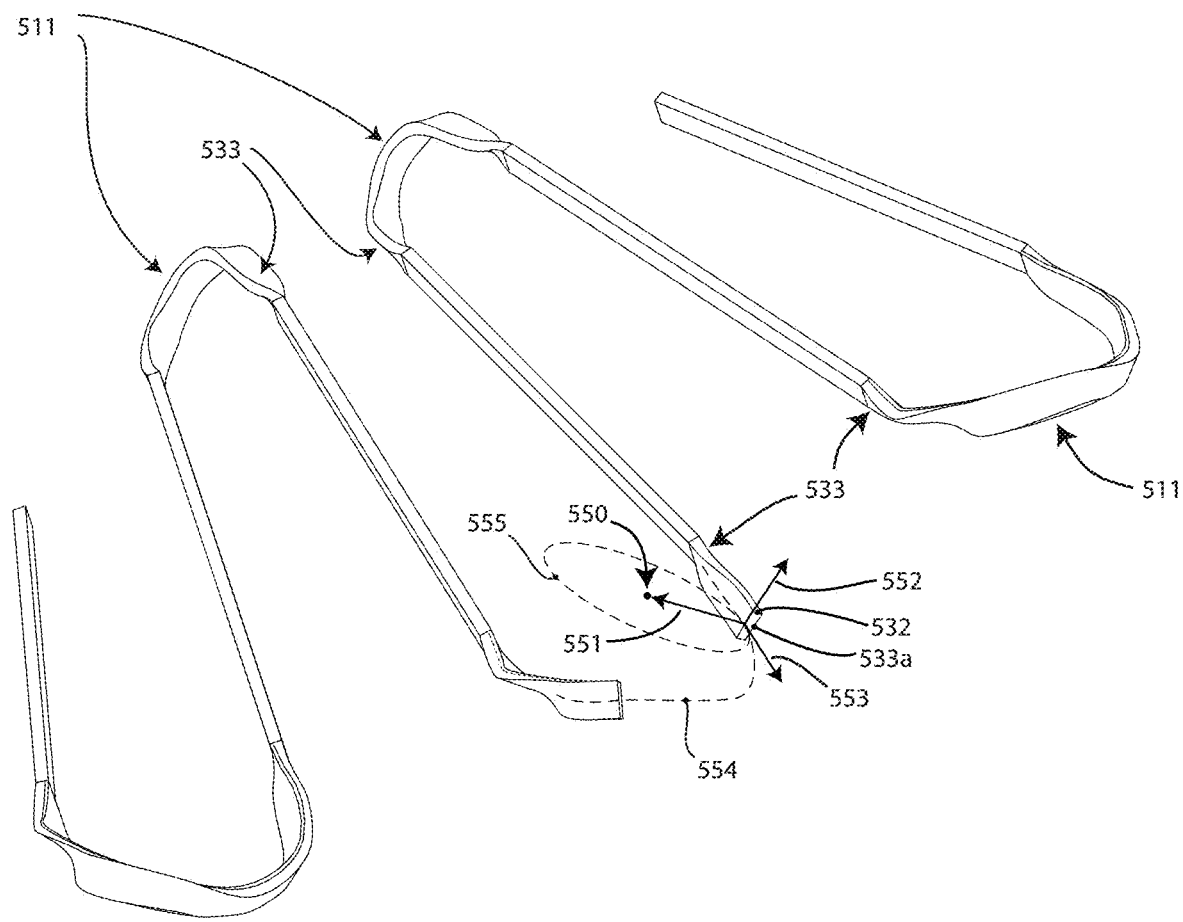
FIG. 55 is an expanded view of part of the conductor in FIG. 53 with a section cut from the end turn to show the conductor cross sections.

FIG. 54 shows an expanded view of the conductor in one layer of winding with sections of the conductor removed to make the cross sectional properties of the conductor evident. The rectangular Litz wire can bend with a small radius of curvature across the long side of the conductor cross section 531 and is much stiffer and does not bend as much across the short side of the conductor cross section 532. This provides an advantage over round type 2 Litz wire since a type 7 or type 8 rectangular Litz wire conductor will bend with a much smaller radius of curvature across the wide dimension of the cross section than a round type 2 Litz conductor of equal cross sectional area. FIG. 55 is an expanded view of the conductor in FIG. 53 with sections removed from the end turn to illustrate the conductor cross section in the end turn area. The rectangular conductors can be twisted (i.e., seen at twisted area 533) near the end turn 511 so that they have a small cross section dimension 532 in approximately the same direction as the local instantaneous curvature vector 551 from the conductor center to the instantaneous center of curvature 550 of the conductor path 554 (illustrated by way of dotted line). It should be readily apparent that the instantaneous center of curvature vector 551 corresponds inherently to a radius of an osculating circle 555 (illustrated by way of dotted line) from the center 550 of the circle 555. The twist is also such that the conductors have a large cross section dimension 533a parallel a vector 552 that is perpendicular to the curvature vector 551 and the conductor path tangential vector 553. When twisted and oriented in this manner the end turns of the conductors from the different phases naturally nest together without deformation of the conductor cross section dimensions by more than 25%. FIG. 55 shows cuts through the winding conductor in various locations illustrating the nearly constant, non-deformed cross section. FIG. 55 shows that the orientation of the conductor with the long dimension of the cross section perpendicular to the instantaneous curvature vector 551 of the end turn allows the conductor to make a tight bend without significant forming pressure or deformation of the conductor cross section which reduces the incidence of strand breakage within the conductor. It will be appreciated that, even if the angle of the conductor twist in the end turn varies somewhat from the ideal described herein, the dimension of the conductor cross section in the direction of the instantaneous curvature vector will be smaller than the dimension of the conductor cross section perpendicular to the instantaneous curvature vector due to the rectangular shape and aspect ratio of the conductor.

The rectangular aspect of the conductor also facilitates windings with five or more phases. In optimal designs for phase counts greater than four, the circumferential width 513 (as seen in FIG. 51) of the phase leg needs to be significantly less than the axial dimension 520 (as seen in FIG. 52) of the phase leg, and the phase leg conductor cross section aspect ratio should be greater than 1.5 to achieve this optimum. Round Litz wire cannot be formed to an aspect of more than about 1.5:1 without significant risk of breaking strands, whereas the type 7 or type 8 Litz wire can be easily manufactured with aspects of 1.5:1 or greater, enabling an electromagnetically optimized winding with phase counts of five or greater.

The cooling enhancements of outer thermally conductive rings, thermally conductive cores within the end turns, fins on the end turns, and fluid passages within the end turns may additionally be applied to the winding construction of FIG. 51.

Figure 56:
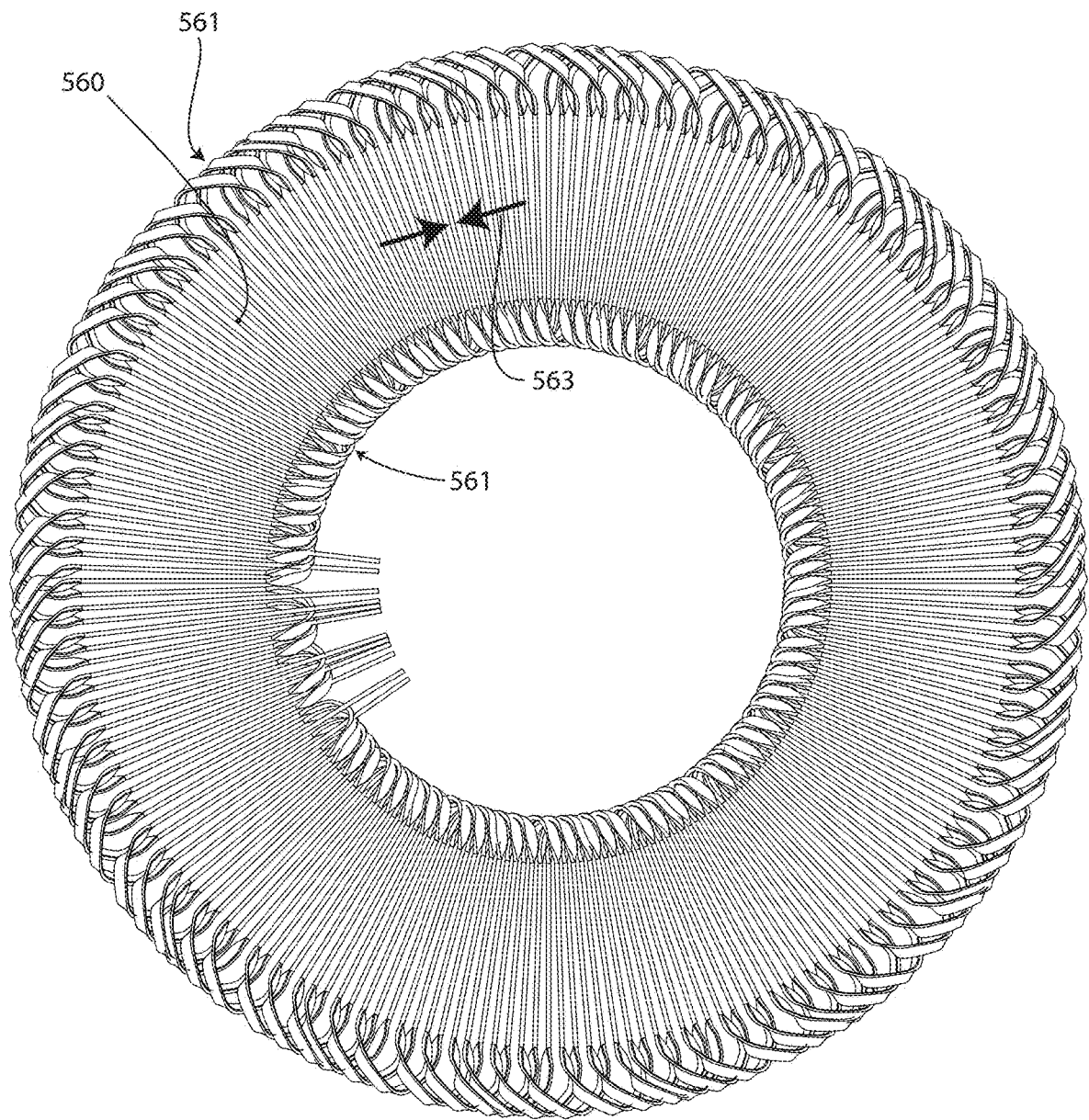
FIG. 56 is a top view of a single-layer, poly-phase winding made from type 7 or type 8 Litz wire.
Figure 57:
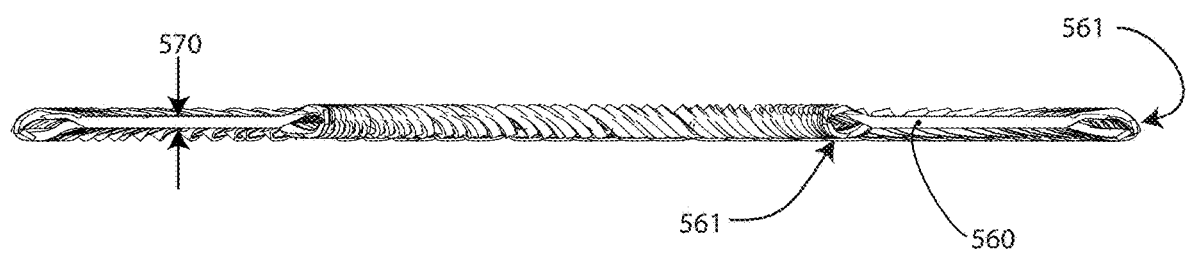
FIG. 57 is a section view of the single-layer winding in FIG. 56.
Figure 58:
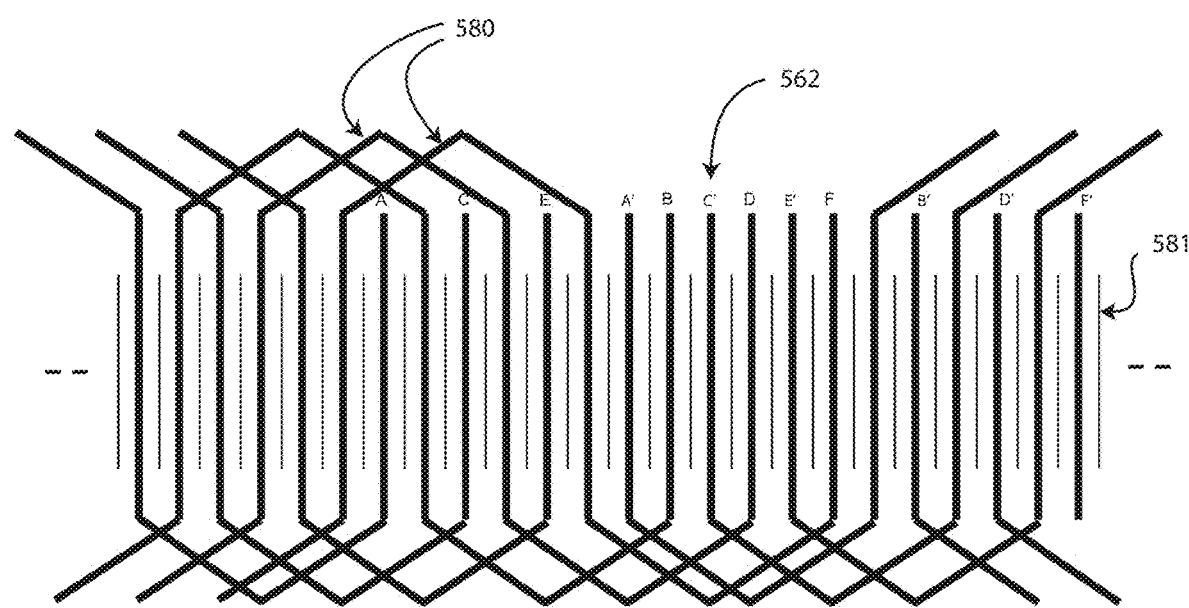
FIG. 58 is one of many possible winding and termination patterns for the winding in FIG. 56.

FIG. 56 shows a top view of yet another alternative embodiment of the invention in which rectangular type 7 or type 8 Litz wire is wound into a single-layer, multiphase electrical machine winding with active legs 560, end turns 561, terminals 562, and circumferential width of the phase leg 563. Note that the circumferential dimension of the active leg conductor portions 563 is shown reduced for clarity in this illustration to visually increase the spacing between conductors and make the individual conductors distinguishable in the figure, FIG. 57 is a cross section of the winding in FIG. 56 showing the axial thickness of the active leg portion of the winding 570. FIG. 58 is a winding belt configuration for a preferred embodiment of a six phase winding; other winding configurations are possible. The figure diagrammatically shows the phase conductors 580 and phase slot demarcations 581. Note that in the winding belt diagram in FIG. 58 that there is only one conductor in each phase slot position. This is in contrast to a two-layer or multi-layer winding such as FIG. 34 where there are multiple conductors for each phase pressed on top of one another in each slot position around the winding. If there is an insulation breakdown between these conductors, the result is a turn to turn short circuit within one phase. High reliability electrical machines are known to have fuses or current interrupting devices placed at the wye point of a three phase wye connected machine (See for example "Fault Interrupting Methods and Topologies for Interior PM Machine Drives", by Welchko et al., published in IEEE Power Electronics Letters, Volume: 2, Issue: 4, December 2004) or at the terminals of phases or sub-phases to stop excessive current flow due to a phase to phase short circuit (see for example U.S. Pat. No. 6,885,162 granted to Stridsberg on Apr. 26, 2005). These fault mitigation measures are not useful in preventing damaging current flows within a single phase conductor due to a turn to turn short circuit within a single phase. Thus, a turn to turn fault within a phase is the worst case failure within a permanent magnet electrical machine.

The single-layer winding with type 7 or type 8 Litz wire disclosed herein eliminates the possibility of a turn to turn short circuit within a phase as each phase conductor only traverses around the winding ring one time and never crosses over or touches itself. Unlike the multi-layer winding, there is only a single conductor in each phase and slot position, so there is no possibility of two conductors of the same phase touching and short circuiting due to insulation breakdown. A single-layer winding is possible using round type 2 Litz wire, but the axial thickness of the conductor leg versus the circumferential width is limited to an aspect of 1.5:1 without overly stressing and breaking the Litz wire strands when the wire is formed into a rectangle. Type 7 or type 8 Litz wire is constructed as a rectangular bundle that can have an aspect of at least 1.5:1 or more which enables an optimized machine design.

The optimal design of dual Halbach array electrical machines usually requires that the phase conductor leg have a taller axial cross section dimension than the circumferential cross section dimension. Especially for machines with phase counts higher than four, the circumferential width of the conductor cross sections becomes greatly reduced compared to the axial height of the cross section in an electromagnetically optimized design. The type 7 or type 8 Litz wire winding enables electromagnetically optimized windings with phase counts greater than four and conductor axial dimensions that are at least 1.5 times greater than their circumferential dimensions.

Electrical machines with phase counts higher than three, and in particular a six phase machine is an advantage over a three phase machine when driven from a voltage source inverter. The ripple currents in the bus capacitor of the inverter may be greatly reduced when the inverter is driving a six phase machine, and since the bus capacitor is one of the larger components of the inverter, the inverter specific power is higher for an inverter for a six phase design. (See page 136 of "Propulsion Systems for Hybrid Vehicles" by Miller as published by The Institution of Electrical Engineers, London, 2004). A six phase machine used as an alternator can also provide for smoother "12-pulse" rectified power when used with rectifier versus the large ripple voltage resulting from "6-pulse" rectification of a three phase machine.

Figure 59:
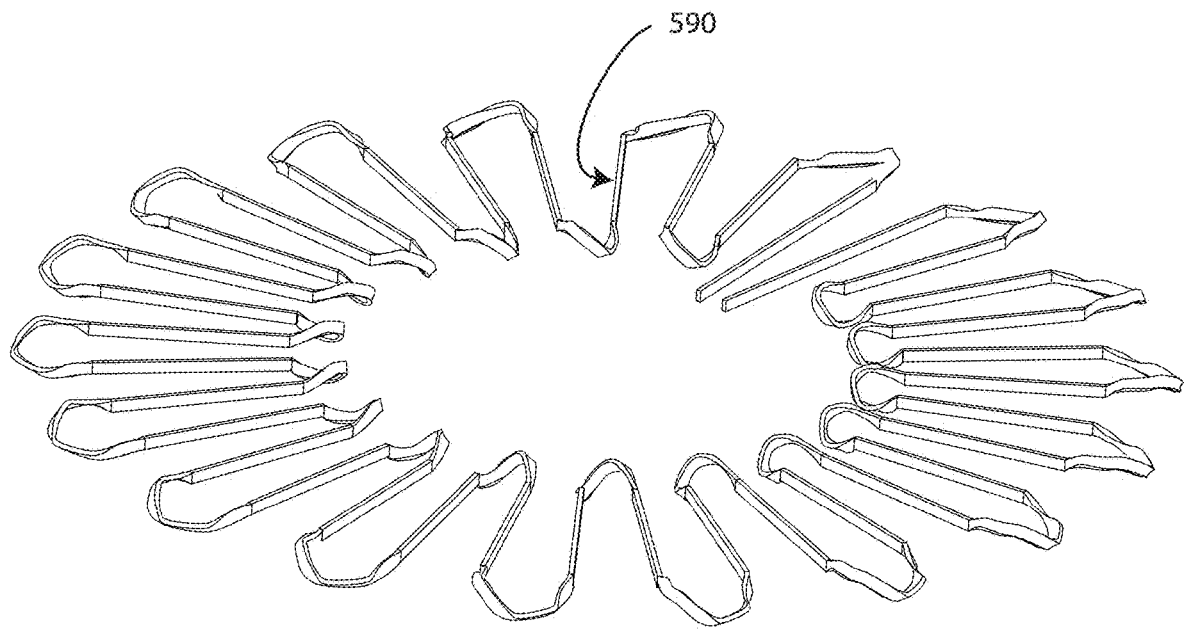
FIG. 59 is a perspective view of one of the conductors isolated for clarity from the winding of FIG. 56.
Figure 60:
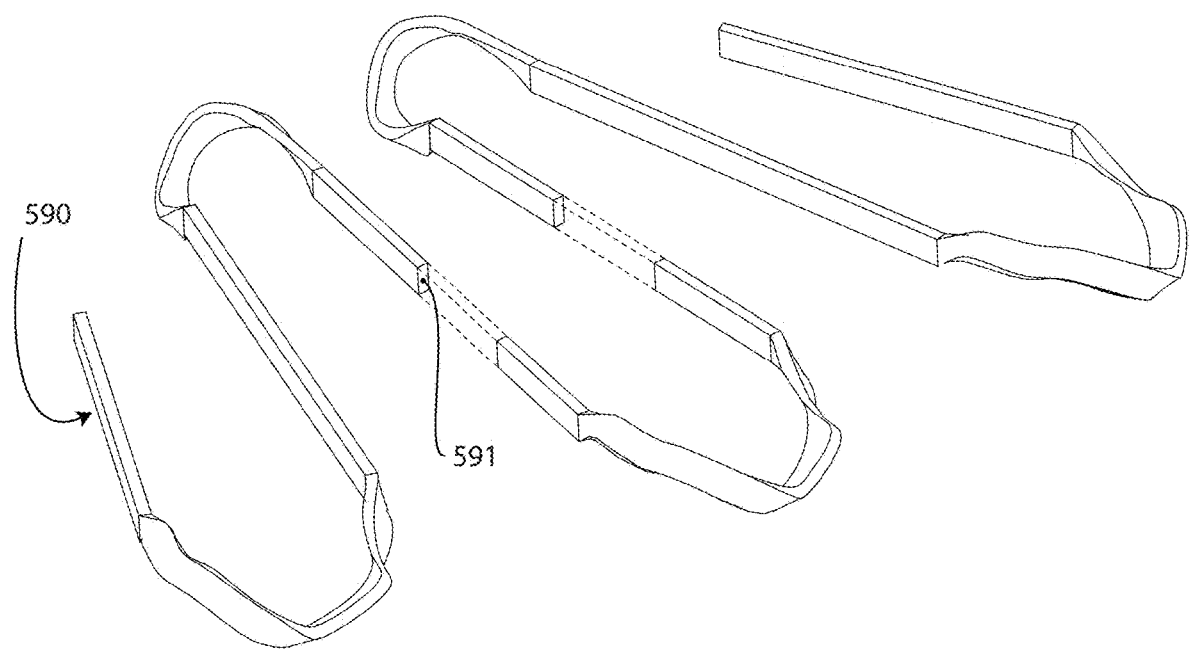
FIG. 60 is an expanded view of part of the conductor in FIG. 56 with a section cut from the phase legs to show the conductor cross sections

FIG. 59 shows a phase conductor isolated from the winding of FIG. 56 for clarity. FIGS. 60 and 61 are expanded views of the conductor in FIG. 59 showing that the winding is formed from rectangular type 7 or type 8 Litz wire having a cross sectional aspect ratio of at least 1.5:1 and the dimensions of the cross section 591 of 61 shows that the conductor twists so that the instantaneous center of curvature vector of the conductor 611 from the conductor cross section center to the instantaneous center of curvature 610 of the conductor path 614 (illustrated by way of dotted line in FIG. 61) is perpendicular to the long edge of the rectangular conductor cross section 591 and parallel to the short edge of the cross section at all points in the end turn 561. As previously mentioned with regard to FIG. 55, it should be readily apparent as well in FIG. 61 that the instantaneous center of curvature vector 611 corresponds inherently to a radius of an osculating circle 615 (illustrated by way of dotted line) from the center 610 of the circle 615. Even if the twist of the conductor varies somewhat from the ideal described herein, in the end turn region the rectangular conductor will have a cross sectional dimension in the direction of its instantaneous center of curvature vector that is smaller than the cross sectional dimension perpendicular to the instantaneous center of curvature vector due to the rectangular shape and aspect ratio of the conductor.

The cooling enhancements of outer thermally conductive rings, thermally conductive cores within the end turns, fins on the end turns, and fluid passages within the end turns may additionally be applied to the winding construction of FIG. 56.

Even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A single-layer, poly-phase Litz wire winding for a coreless stator of an axial flux electrical machine, the winding comprising:
   conductors having a single conductor in each phase and slot position, the conductors forming end turns in an uncompressed state within an end turn region of the winding, the conductors selected from insulated strands that are formed into a rectangular woven braid or insulated strands that are formed into a rectangular bundle and each having a rectangular conductor cross section with an aspect of 1.5:1 or more;
   a polymer resin encapsulating the conductors; and
   wherein each single conductor in each phase traverses around the winding only once without crossing over or touching itself such that turn-to-turn short circuits within a phase are precluded.

2. The single-layer winding of claim 1 including a thermally conductive ring affixed to an edge of the winding in thermal contact with the end turns, and the polymer resin fills voids and gaps between the end turns and the ring while providing a thermal path from the end turns to the ring.

3. The single-layer winding of claim 1 having a thermally conductive fin placed between at least two of the end turns.

4. The single-layer winding of claim 1 having a thermally conductive core extending through the end turn region of the winding in at least two locations, and a thermally conductive fin extending from the core and between at least two of the end turns.

5. The single-layer winding of claim 1 having a thermally conductive coolant tube passing through the end turn region of the winding in at least two locations, the tube including at least two terminals for introducing coolant into the tube and removing coolant from the tube, and the encapsulant fills voids and gaps between the end turns and the tube while providing a thermal path from the end turns to outer surface of the tube.

6. A single-layer, poly-phase Litz wire winding for a coreless stator of an axial flux electrical machine, the winding comprising:
   conductors having a single conductor in each phase and slot position, the conductors forming end turns in an uncompressed state within an end turn region of the winding, the conductors selected from insulated strands that are formed into a rectangular woven braid or insulated strands that are formed into a rectangular bundle and each having a rectangular conductor cross section with an aspect of 1.5:1 or more;
   a polymer resin encapsulating the conductors; and
   wherein the conductors are twisted such that in the end turn region of the winding each conductor has a cross sectional dimension in a direction of its instantaneous center of curvature vector that is smaller than a cross section dimension perpendicular to the instantaneous center of curvature vector, and the conductors include phase leg width in a circumferential direction that is substantially less than a dimension of the phase leg in an axial direction, and each conductor traverses around the winding only once without crossing over or touching itself such that turn-to-turn short circuits within a phase are precluded.

7. The single-layer winding of claim 6 including a thermally conductive ring affixed to an edge of the winding in thermal contact with the end turns, and the polymer resin fills voids and gaps between the end turns and the ring while providing a thermal path from the end turns to the ring.

8. The single-layer winding of claim 6 having a thermally conductive fin placed between at least two of the end turns.

9. The single-layer winding of claim 6 having a thermally conductive core extending through the end turn region of the winding in at least two locations, and a thermally conductive fin extending from the core and between at least two of the end turns.

10. The single-layer winding of claim 6 having a thermally conductive coolant tube passing through the end turn region of the winding in at least two locations, the tube including at least two terminals for introducing coolant into the tube and removing coolant from the tube, and the encapsulant fills voids and gaps between the end turns and the tube while providing a thermal path from the end turns to outer surface of the tube.

* * * * *